United States Patent
Lee et al.

(10) Patent No.: US 12,461,103 B2
(45) Date of Patent: Nov. 4, 2025

(54) BIOMARKER CEREBLON FOR DIAGNOSING HEPATOCELLULAR CARCINOMA, AND NOVEL MONOCLONAL ANTIBODY SPECIFIC THERETO

(71) Applicants: UNIVERSITY OF ULSAN FOUNDATION FOR INDUSTRY COOPERATION, Ulsan (KR); THE ASAN FOUNDATION, Seoul (KR)

(72) Inventors: Kyung Jin Lee, Hanam-si (KR); Sin Hwang, Seoul (KR)

(73) Assignees: UNIVERSITY OF ULSAN FOUNDATION FOR INDUSTRY COOPERATION, Ulsan (KR); THE ASAN FOUNDATION, Seoul (KR)

( * ) Notice: Subject to any disclaimer, the term of this patent is extended or adjusted under 35 U.S.C. 154(b) by 1043 days.

(21) Appl. No.: 17/441,386

(22) PCT Filed: Mar. 23, 2020

(86) PCT No.: PCT/KR2020/003963
§ 371 (c)(1),
(2) Date: Sep. 21, 2021

(87) PCT Pub. No.: WO2020/197227
PCT Pub. Date: Oct. 1, 2020

(65) Prior Publication Data
US 2022/0178929 A1    Jun. 9, 2022

(30) Foreign Application Priority Data
Mar. 22, 2019   (KR) .................. 10-2019-0032863

(51) Int. Cl.
*G01N 33/574*   (2006.01)
*C07K 16/18*   (2006.01)
(Continued)

(52) U.S. Cl.
CPC ....... *G01N 33/57438* (2013.01); *C07K 16/18* (2013.01); *C12N 5/163* (2013.01);
(Continued)

(58) Field of Classification Search
CPC ....... G01N 33/57438; G01N 2333/471; G01N 2800/52; G01N 2333/90; G01N 2800/56;
(Continued)

(56) References Cited

U.S. PATENT DOCUMENTS 8,906,932 B2   12/2014   Muller et al.
9,365,640 B2   6/2016   Lopez-Girona et al.
(Continued)

FOREIGN PATENT DOCUMENTS

KR   10-2014-0024914 A   3/2014
KR   10-2014-0025374 A   3/2014
(Continued)

OTHER PUBLICATIONS

Chang et al. Mouse Monoclonal Antibodies Generated from Full Length Human Cereblon: Detection of Cereblon Protein in Patients with Multiple Myeloma. Int J Mol Sci. Sep. 17, 2017;18(9):1999. (Year: 1999).*

(Continued)

*Primary Examiner* — Christopher L Chin
*Assistant Examiner* — Ellis Follett Lusi
(74) *Attorney, Agent, or Firm* — Oblon, McClelland, Maier & Neustadt, L.L.P.

(57) ABSTRACT

Provided are the use of cereblon (CRBN) as a biomarker for diagnosis of hepatocellular carcinoma and novel monoclonal antibodies specific to CRBN. More specifically, provided are a composition and a kit for diagnosing or predicting the prognosis of hepatocellular carcinoma by using CRBN as a biomarker for diagnosis of hepatocellular carcinoma, an information providing method for diagnosing or predicting (Continued)

Many HCCs show CRBN overexpression. (~50%)

the prognosis of hepatocellular carcinoma, two novel monoclonal antibodies binding specifically to CRBN, and hybridoma cells producing the same. The expression level difference of CRBN protein allows patients with hepatocellular carcinoma to be diagnosed early and indicates better predictive capabilities than the presence or absence of microvascular invasion, which was an important factor in predicting a prognosis of hepatocellular carcinoma in prior art, and thus can be expected to be used as a diagnostic marker to diagnose hepatocellular carcinoma and to evaluate a prognosis after hepatic resection.

3 Claims, 6 Drawing Sheets

Specification includes a Sequence Listing.

(51) Int. Cl.
*C12N 5/16* (2006.01)
*C12Q 1/6886* (2018.01)

(52) U.S. Cl.
CPC ..... *C12Q 1/6886* (2013.01); *C12Q 2600/158* (2013.01); *G01N 2333/471* (2013.01); *G01N 2800/52* (2013.01)

(58) Field of Classification Search
CPC .. G01N 2333/47; G01N 33/577; C07K 16/18; C07K 16/40; C07K 2317/34; C12N 5/163; C12Q 1/6886; C12Q 2600/158; C12Q 2600/118
USPC ............................ 436/501; 530/388.1, 388.2
See application file for complete search history.

(56) References Cited

U.S. PATENT DOCUMENTS

| | | | |
|---|---|---|---|
| 9,542,508 | B2 | 1/2017 | Altundas et al. |
| 10,047,151 | B2 | 8/2018 | Lopez-Girona et al. |
| 2012/0322073 | A1* | 12/2012 | Lopez-Girona ............................ G01N 33/57484 435/7.1 |
| 2014/0148473 | A1 | 5/2014 | Gandhi et al. |
| 2015/0126538 | A1 | 5/2015 | Muller et al. |
| 2016/0136167 | A1 | 5/2016 | Gandhi et al. |
| 2017/0165266 | A1 | 6/2017 | Gandhi et al. |
| 2017/0242014 | A1 | 8/2017 | Hagner et al. |
| 2018/0055844 | A1 | 3/2018 | Muller et al. |
| 2018/0231561 | A1 | 8/2018 | Gandhi et al. |

FOREIGN PATENT DOCUMENTS

| | | |
|---|---|---|
| WO | WO 2012/149299 A2 | 11/2012 |
| WO | WO 2016/060702 A1 | 4/2016 |
| WO | WO 2017/027672 A1 | 2/2017 |

OTHER PUBLICATIONS

Frei et al. Comprehensive mapping of functional epitopes on dengue virus glycoprotein E DIII for binding to broadly neutralizing antibodies 4E11 and 4E5A by phage display. Virology. Nov. 2015;485:371-82. (Year: 2015).*

International Search Report issued on Jun. 30, 2020 in PCT/KR2020/003963 filed Mar. 23, 2020, 3 pages.

Kang, S., "A Development Study on Cereblon as a New Diagnostic and Prognostic Biomarker for Hepatocellular Carcinoma", Ph.D. thesis, University of Ulsan, 2017, pp. 1-40, 49 total pages.

* cited by examiner

FIG. 9

```
          1
Human     MAGEGDOODDA AHMMGNHLPL LPAESEED--- ---EMEVEDDQ SREARLPNII MFDTSLPTSH TYLGQMEEF HGRTLHQND
Mouse     MAGEGDOODDA AHMMGNHLPL LPADSEDEDD EIEMEVEDDQ SREARLPNII MFDTSLPTSH TYLGQMEEF HGRTLHQND
                                        Prediction 1                              Prediction 2
          81                                                                                    160
Human     QDVIPVLPQV MMILIPQGTL PLQLFHPQEV SMVRHLIQHQ RTFAVLAVSH VQEREAQFGT TAEIYAYREE QDFBIE MKV
Mouse     QDVIPVLPEV LMILIPQGTL PLQLSPQEV  SMVRHLIQHQ RTFAVLAVSH VQEREAQFGT TAEIYAYREE QEEBIEP MKV
                                                                              Prediction 3
          161                                                                                   240
Human     KAIPQFFKV  LELRTQSDI  QQAKVQILPE QVLPSTMSAV QLEBLIKQQI FPSVPVSPED QCSYKMMQKY QKPKFHQAAL
Mouse     KAIPQFFKV  LELRTQSED  QQAKVQILPE QVLPSTMSAV QLEBLIKQQV FPSVFISMED QYSQMMQKY  QKPKFHQAAL
                Prediction 4
          241                                                                                   320
Human     TSMPRWLYSL YDAETLMRI  KKQLREMDEN LKQQSLPSHP IQFSYRVAAC LPIDDVLRIQ LLKIQSAIQR LRQELDIMMK
Mouse     TSMPRWLYSL YDAETLMRI  KKQLREMDEN LKQQSLPEHP IQFSYRVAAC LPIDDVLRIQ LLKIQSAIQR LRQELDIMMK
                              Prediction 5
          321                                                                                   400
Human     CTSLQQHQQQ ETEITTMNEI FSLSLQGPMA AYYMPHGVVH ETLTVYKACM LNLIGRPSTE HSMFPGYAMT VAQQKICASH
Mouse     CTSLQQHQQQ ETEITTMNEI FSLSLQGPNA AWMPHGVVH  ETLTVYKASM LNLIGRPSTV HSMFPGYAMT IAQQKICASH
          401                                         445
Human     IQMKFTATNK DMSPQIFWGL TRSALLPTIP DTEDEISPQK VILQL
Mouse     IQMKFTATNK DMSPQIFWGL TRSALLPTIP ETEDEISPQK VILQL
```

BIOMARKER CEREBLON FOR DIAGNOSING HEPATOCELLULAR CARCINOMA, AND NOVEL MONOCLONAL ANTIBODY SPECIFIC THERETO

TECHNICAL FIELD

The present disclosure relates to the use of cereblon (CRBN) as a biomarker for diagnosis of hepatocellular carcinoma and a novel monoclonal antibody specific to CRBN and, more specifically, to a composition and a kit for diagnosing or predicting the prognosis of hepatocellular carcinoma by using CRBN as a biomarker for diagnosis of hepatocellular carcinoma, a method of providing information for diagnosing hepatocellular carcinoma or predicting the prognosis, two novel monoclonal antibodies binding specifically to CRBN, and hybridoma cells producing the same.

BACKGROUND ART

Hepatocellular carcinoma is a primary hepatocellular carcinoma developed in the liver, and according to the national cancer registration statistics in 2014, the incidence rate thereof among all cancers ranks 6th, but the five-year survival rate thereof is only 32.8%, which is very high compared to the incidence rate. In particular, hepatitis virus carrying rates are high in Asia, including Korea, and hepatocellular carcinoma has bad prognosis, for example, the 2nd to 3rd mortality rate with respect to cancer incidence. Accordingly, it is important to prevent and early detect the hepatocellular carcinoma.

Until now, the prognosis of hepatocellular carcinoma after resection has been evaluated in terms of tumor size and number, microvascular invasion, FDG-PET CT findings, and tumor indicators (AFP, PIVKA-II [DCP]), etc. However, in the case of early hepatocellular carcinoma, most of the factors indicating these tumor characteristics are at low levels, and thus discriminatory power thereof is poor.

In order to develop diagnostic markers in Korea, research is being conducted on omics such as genomics, proteomics, and metabolomics, while the field of diagnostic biochips using BT/IT is being promoted as part of the next-generation growth engine business. However, there are not many products using biomarkers developed in Korea yet. Regarding hepatocellular carcinoma showing a wide variety of clinical processes, reliable prognosis prediction would play a very important role.

Recently, several studies have confirmed anti-cancer effects through activity control of adenosine monophosphate-activated protein kinase (AMPK), which is an intracellular energy sensor. AMPK is a heterotrimeric protein complex consisting of three subunits of α, β and γ, and plays an important role in sugar, lipid and cholesterol metabolism control. Recently, it has been confirmed that cereblon (CRBN) known as a substrate receptor of cullin-ring ubiquitin lipase (CRL) can inhibit the activity of AMPK by directly binding to the a subunit of the AMPK trimer.

CRBN proteins are found in a variety of tissues including brain, placenta, retina, skeletal muscle, liver, kidney, pancreas, spleen, testes, prostate, small intestine, and the like. According to studies on CRBN in the related art, CRBN levels can be used to predict responses to immunomodulatory drugs in multiple myeloma and leukemia, and high CRBN levels have been found to enhance the effects of immunomodulatory drugs and to be associated with patient survival. CRBN has been found to be the only protein that inhibits the activity of endogenous AMPK, and the use thereof may contribute to the development of biomarkers for other tumors.

Meanwhile, Korean Patent Application Publication No. 10-2014-0024914 discloses a method of treating cancer and inflammatory diseases using CRBN as a predictor, but discloses only a treatment method using a compound that binds directly to CRBN-DDB1 and/or CRBN E3 ubiquitin-ligase complexes and causes malfunctioning of CRBN, and has not described a monoclonal antibody that specifically binds to CRBN.

Accordingly, the present inventors investigated the expression of CRBN protein in tissues of hepatocellular carcinoma patients, analyzed the recurrence and survival of postoperative hepatocellular carcinoma in patients to evaluate and verify the possibility of CRBN as a biomarker for early diagnosis and prognosis prediction of hepatocellular carcinoma, and prepared two novel monoclonal antibodies binding specifically to CRBN to demonstrate the possibility of diagnosis and prognosis prediction of hepatocellular carcinoma, thereby completing the present disclosure.

DESCRIPTION OF EMBODIMENTS

Technical Problem

Accordingly, an objective of the present disclosure is to provide a composition and a kit for diagnosing or predicting prognosis of hepatocellular carcinoma by using CRBN.

Another objective of the present disclosure is to provide a method of providing information for diagnosing or predicting prognosis of hepatocellular carcinoma by using CRBN.

Another objective of the present disclosure is to provide monoclonal antibodies binding specifically to CRBN and hybridoma cell producing the same.

Technical Solution to Problem

The present disclosure provides a composition for diagnosing or predicting prognosis of hepatocellular carcinoma, the composition including an agent for measuring the level of mRNA of CRBN gene or protein expressed therefrom.

According to an embodiment of the present disclosure, the agent for measuring the mRNA level of the gene may include a primer pair, a probe, or an antisense nucleotide, each of which specifically binds to the gene.

According to an embodiment of the present disclosure, the agent for measuring the protein level may include an antibody or an aptamer which is specific to the protein.

According to an embodiment of the present disclosure, the antibody may include at least one monoclonal antibody selected from the group consisting of a monoclonal antibody produced by hybridoma cell having accession number KCTC18596P and a monoclonal antibody produced by hybridoma cell line having accession number KCTC18598P.

The present disclosure also provides a kit for diagnosing or predicting prognosis of hepatocellular carcinoma, the kit including the composition described above.

According to an embodiment of the present disclosure, the kit may be a RT-PCR kit, a competitive RT-PCR kit, a real-time RT-PCR kit, a DNA chip kit, or a protein chip kit.

The present disclosure also provides an information providing method for the diagnosis of hepatocellular carcinoma, the information providing method including:

(a) measuring a level of mRNA of CRBN gene or protein expressed therefrom in a biological sample separated from a subject; and
(b) comparing the measured level with that of a level measured in a biological sample separated from a normal subject.

According to an embodiment of the present disclosure, the information providing method for diagnosing hepatocellular carcinoma may further include (c) determining as hepatocellular carcinoma, when the level of mRNA or protein expressed therefrom measured in the biological sample of step (a) is higher than that of measured in a biological sample separated from a normal subject or the subject of step (a).

In addition, the present disclosure provides an information providing method for predicting the prognosis of hepatocellular carcinoma, the information providing method including:
(a) measuring a level of mRNA of CRBN gene or protein expressed therefrom in a biological sample separated from each of a hepatocellular carcinoma tissue and its surrounding normal tissue of the hepatocellular carcinoma patient; and
(b) corn paring the measured levels of the samples.

According to an embodiment of the present disclosure, the information providing method for predicting the prognosis of hepatocellular carcinoma may further include (c) determining as poor prognosis, when the level of mRNA of CRBN gene or protein expressed therefrom measured in a biological sample separated from hepatocellular carcinoma tissue of step (a) is more than twice as much that of measured in a biological sample separated from normal tissue.

According to another embodiment of the present disclosure, the information providing method for predicting the prognosis of hepatocellular carcinoma may further include:
(d-1) classifying as a CRBN high-expressed patient group when the level of mRNA of CRBN gene or protein expressed therefrom measured in a biological sample separated from hepatocellular carcinoma tissue of step (a) is more than twice as much that of measured in a biological sample separated from its surrounding normal tissue, and classifying as a CRBN low-expressed patient group when the level is less than twice as much of the measured;
(d-2) measuring AFP (α-fetoprotein) levels in blood separated from the high expressed group patient and the low expressed group patient; and
(d-3) determining the high expressed group patient as poor prognosis when the AFP level measured in blood separated from the high expressed group patient is higher than that of the AFP level measured in blood separated from the low expressed group patient.

The present disclosure also provides hybridoma cell having accession number KCTC18596P, and a monoclonal antibody produced therefrom and binding specifically to cereblon (CRBN).

According to an embodiment of the present disclosure, the monoclonal antibody may bind specifically to a region of the cereblon including at least one amino acid sequence selected from the group consisting of SEQ ID NOs: 3 and 6.

The present disclosure also provides hybridoma cell having accession number KCTC18598P and a monoclonal antibody produced therefrom and binding specifically to CRBN.

According to an embodiment of the present disclosure, the monoclonal antibody may bind specifically to a region of the cereblon including the amino acid sequence of SEQ ID NO: 3.

Advantageous Effects of Disclosure

The CRBN-specific monoclonal antibody of the present disclosure has remarkably improved diagnostic sensitivity and specificity compared with CRBN multi-clone antibody of the related art, and is effective in early diagnosis of hepatocellular carcinoma and predicting prognosis after surgery. In addition, the expression level difference of CRBN protein allows patients with hepatocellular carcinoma to be diagnosed early and indicates better predictive capabilities than the presence or absence of microvascular invasion, which was an important factor in predicting a prognosis of hepatocellular carcinoma in prior art, and thus can be expected to be used as a diagnostic marker to diagnose hepatocellular carcinoma and to evaluate a prognosis after hepatic resection.

Figure 5:
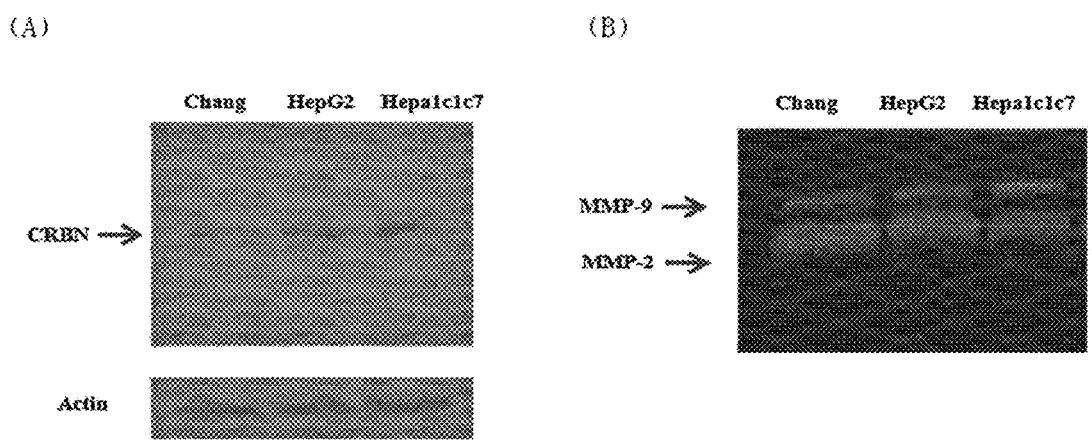

(A) of FIG. 5 shows western blot analysis results in which CRBN expression levels according to cell lines were compared, and (B) of FIG. 5 shows western blot analysis results in which MMP-9 and MMP-2 expression levels according to cell lines were compared.

Figure 6:
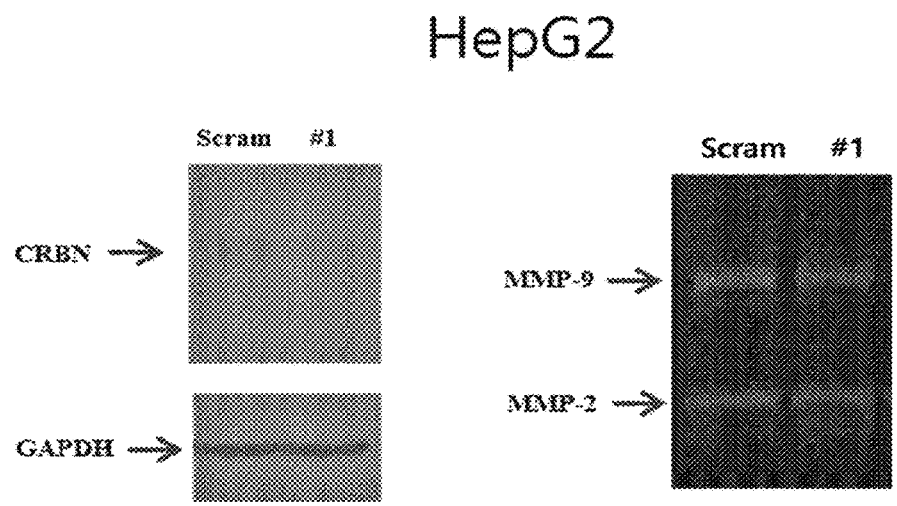

FIG. 6 shows the results of comparing the expression levels of CRBN, MMP-9 and MMP-2 in the HepG2 cell line in which CRBN gene expression was inhibited using siRNA (Scam; control group, #1; siRNA treatment group).

Figure 7:
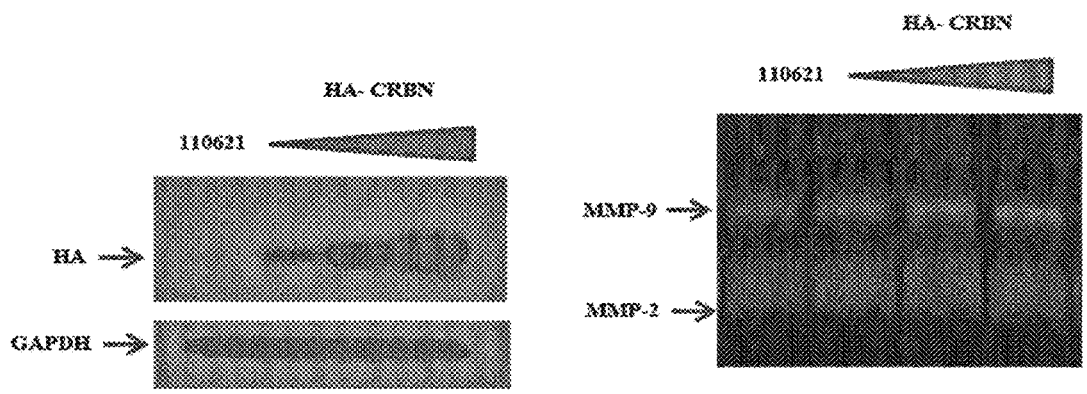

FIG. 7 shows the results of comparing expression levels of MMP-9 and MMP-2 in human-derived hepatocellular carcinoma primary culture cell lines in which CRBN was activated using HA-CRBN (pCDNA3) (110621; control group, HA-CRBN; CRBN expression activation).

Figure 8:
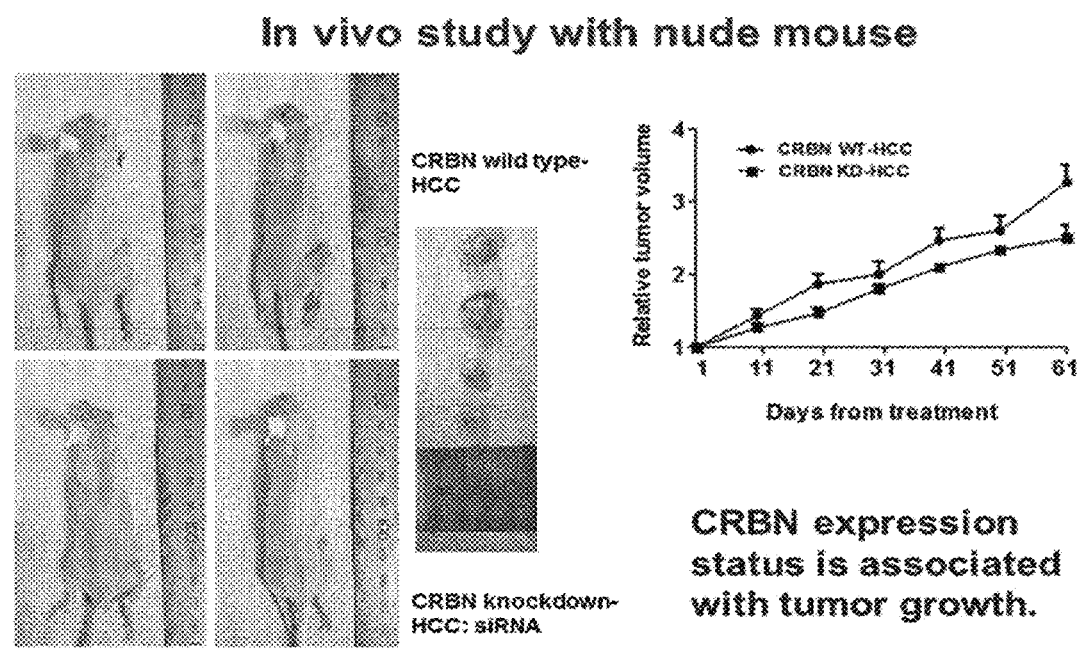

FIG. 8 shows the results of measuring tumor volumes in nude mouse transplanted with WT and CRBN knockdown primary cell carcinoma cell line (CRBN KD-HCL), respectively.

FIG. 9 shows an antigen peptide sequence suitable for producing monoclonal antibodies among human CRBN protein sequences, showing homology with the mouse sequence.

DETAILED DESCRIPTION OF INVENTION

As described above, hepatocellular carcinoma is a cancer having a very high mortality rate, and it is important to prevent and early detect the same. Accordingly, there is a need to develop biomarkers that can reliably diagnose the cancer at an early stage. Accordingly, the present inventors have evaluated and verified the possibility of CRBN as a biomarker for early diagnosis and prognosis prediction of hepatocellular carcinoma, and have also prepared two novel monoclonal antibodies binding specifically to CRBN to show the possibility of diagnosis and prognosis prediction of hepatocellular carcinoma, thereby seeking solutions to the above-described problems.

Accordingly, a first aspect of the present disclosure relates to a composition for diagnosis or prognosis prediction of hepatocellular carcinoma, including an agent for measuring the level of mRNA of CRBN gene or protein expressed therefrom, and a kit including the composition.

The term "CRBN" in the present disclosure refers to "cereblon". The term "CRBN (cereblon) protein" refers to a substrate receptor of CRL (cullin-ring ubiquitin ligase), and it is known that mild psychosis occurs when a mutation appears in the cereblon gene. CRBN is known as a protein that directly binds to AMPK and inhibits the activation of AMPK, and there is a report that metabolic diseases can be treated by activating CRBN caused by inhibition of the expression of AMPK. The CRBN protein is not particularly limited, but may be a human CRBN protein.

The CRBN protein is encoded by the CRBN gene, and the CRBN protein and the gene encoding the same respectively include all forms of the CRBN protein and the CRBN gene that may be generated in a subject to be diagnosed. Specifically, the term "CRBN protein" as used herein may include a non-mutated form consisting of 442 known amino acids or a mutated form of CRBN protein in which substitution, insertion, deletion, etc. of a specific amino acid occurs, and may include a part of the non-mutated or mutated CRBN protein. In addition, the term "CRBN gene" includes a nucleotide sequence encoding all of the above-described forms of CRBN protein.

The information on CRBN may be obtained from a known database such as GenBank of the U.S. National Institutes of Health, and may be, for example, information on CRBN protein having the accession number of BC_067811 (Gene ID: 51185). The CRBN protein of the present disclosure may be a human cereblon protein represented by the amino acid sequence of Human CRBN (442 aa) of SEQ ID NO: 1, but is not limited thereto.

[SEQ ID NO: 1]
MAGEGDQQDA AHNMGNHLPL LPAESEEEDE MEVEDQDSKE

AKKPNIINFD TSLPTSHTYL

GADMEEFHGR TLHDDDSCQV IPVLPQVMMI LIPGQTLPLQ

LFHPQEVSMV RNLIQKDRTF

AVLAYSNVQE REAQFGTTAE IYAYREEQDF GIEIVKVKAI

GRQRFKVLEL RTQSDGIQQA

KVQILPECVL PSTMSAVQLE SLNKCQIFPS KPVSREDQCS

YKWWQKYQKR KFHCANLTSW

PRWLYSLYDA ETLMDRIKKQ LREWDENLKD DSLPSNPIDF

SYRVAACLPI DDVLRIQLLK

-continued
IGSAIQRLRC ELDIMNKCTS LCCKQCQETE ITTKNEIFSL

SLCGPMAAYV NPHGYVHETL

TVYKACNLNL IGRPSTEHSW FPGYAWTVAQ CKICASHIGW

KFTATKKDMS PQKFWGLTRS

ALLPTIPDTE DEISPDKVIL CL

The term "agent for measuring the expression level of mRNA of CRBN or protein thereof" refers to a molecule that can be used to determine the expression level of the CRBN gene of the present disclosure or protein encoded by the gene, and for example, a primer pair, a probe, or an antisense nucleotide that binds specifically to the CRBN gene, or an antibody or an aptamer specific to the protein encoded by the CRBN gene.

The term "antibody" used herein refers to a term that is known in the art and a specific protein molecule that is indicated for an antigenic site. For the purpose of the present disclosure, the antibody refers to an antibody binding specifically to the marker of the present disclosure, and the antibody may be prepared in such a manner that a protein encoded by the marker gene is obtained by cloning each gene in an expression vector according to a conventional method, and the antibody is prepared from the obtained protein according to a conventional method. Herein, a partial peptide that can be made from the protein may be included, and the partial peptide according to the present disclosure may include at least 7 amino acids, or 9 amino acids, or 12 or more amino acids. Forms of the antibody of the present disclosure are not particularly limited. The antibody may include polyclonal antibodies, monoclonal antibodies, or a portion thereof as long as there are antigen binding properties, and all immunoglobulin antibodies. Furthermore, the antibody of the present disclosure includes a special antibody such as a humanized antibody. The antibody specific to the protein encoded by the biomarker gene of the present disclosure may be any antibody that can be prepared by a known method in the art. For example, an antibody used in the detection of a cancer diagnostic marker of the present disclosure may include a complete form having two full-length light chains and two full-length heavy chains, as well as functional fragments of the antibody molecule. The functional fragment of the antibody molecule refers to a fragment having at least an antigen binding function, and may be Fab, F(ab'), F(ab')$_2$, Fv, or the like, but is not particularly limited thereto.

In an embodiment of the present disclosure, the kit includes at least one monoclonal antibody selected from the group consisting of a monoclonal antibody produced by the hybridoma cell having accession number KCTC18596P and a monoclonal antibody produced by the hybridoma cell line having accession number KCTC18598P, and these antibodies will be described in more detail when the fourth aspect of the present disclosure is described.

The term "aptamer" as used herein refers to a single-stranded oligonucleotide, and a nucleic acid molecule having a binding activity to a certain target molecule. The aptamer may have various three-dimensional structures according to the base sequence thereof, and may have high affinity to a specific material, such as an antigen-antibody reaction. The aptamer may inhibit the activity of a certain target molecule by binding to the certain target molecule.

The aptamer of the present disclosure may be RNA, DNA, modified nucleic acid, or a mixture thereof, and the form thereof may be linear or cyclic, but is not limited thereto. The aptamer having a binding activity to CRBN may be easily prepared by a person having ordinary skill in the art by referring to each base sequence according to a known method.

The term "primer" used herein refers to a nucleic acid sequence having a short free 3' hydroxyl group, and a short nucleic acid which is capable of forming a base pair with a complementary template and functions as a starting point for copying the template. According to the present disclosure, PCR amplification is performed using the sense and antisense primers of the marker polynucleotide of the present disclosure so as to perform diagnosis or prognosis prediction of hepatocellular carcinoma through the degree of production of a desired product. The PCR conditions, and lengths of the sense and antisense primers may be modified based on those known in the art.

The term "probe" used herein refers to a nucleic acid fragment such as RNA or DNA corresponding to several bases to several hundreds of bases, which can bind specifically to mRNA, and is labeled to confirm the presence or absence of a specific mRNA. The probe may be constructed in the form of an oligonucleotide probe, a single stranded DNA probe, a double stranded DNA probe, an RNA probe, and the like. According to the present disclosure, hybridization is performed using a probe complementary to the CRBN polynucleotide of the present disclosure, and through the degree of hybridization, the prognosis of hepatocellular carcinoma is predicted. Conditions for the selection and hybridization of suitable probes may be modified based on those known in the art.

The primer or probe of the present disclosure may be chemically synthesized using a phosphoramidite solid support method or other well-known methods. Such nucleic acid sequences may also be modified using many means known in the art. Non-limiting examples of such modifications include methylation, captioning, substitution of natural nucleotides with one or more homologs, and modifications between nucleotides, such as, for example, modifications to uncharged conjugates (e.g., methyl phosphonate, phosphotriester, phosphoroamidate, carbamate, etc.) or charged conjugates (e.g., phosphorothioate, phosphorodithioate, etc.).

The kit of the present disclosure may be used to perform the diagnosis of hepatocellular carcinoma and predict prognosis of hepatocellular carcinoma, by confirming the mRNA expression level of the CRBN gene or the expression level of the protein encoded by the gene.

According to an embodiment of the present disclosure, the kit for measuring the mRNA expression level of the CRBN gene may be a kit including essential elements required for performing RT-PCR. The RT-PCR kit may include, in addition to each primer pair specific for the marker gene, test tubes or other suitable containers, reaction buffers, deoxynucleotides (dNTPs), Taq-polymerases and reverse transcriptase, DNase, RNase inhibitors, DEPC-water, sterile water, etc.

According to another embodiment of the present disclosure, the kit of the present disclosure may be a kit for detecting CRBN, including essential elements required to perform a DNA chip. The DNA chip kit includes a substrate in which a cDNA corresponding to a gene or fragment thereof is attached as a probe, and the substrate may include a cDNA corresponding to a quantitative control gene or fragment thereof.

According to another embodiment of the present disclosure, the kit for measuring the expression level of the protein encoded by CRBN in the present disclosure may include, for immunological detection of an antibody, a substrate, a suitable buffer solution, a secondary antibody labeled with a chromogenic enzyme or a fluorescent material, and a chromogenic substrate. The substrate may be a nitrocellulose film, a 96-well plate synthesized with a polyvinyl resin, a 96-well plate synthesized with a polystyrene resin, a slide glass made of glass, or the like, the chromogenic enzyme may be peroxidase or alkaline phosphatase, the fluorescent material may be FITC, RITC, or the like, and the chromogenic liquid may be 2,2'-azino-bis-(3-ethylbenzothiazolin-6-sulfonic acid) (ABTS), o-phenylenediamine (OPD), tetramethyl benzidine (TMB), or the like.

The kit of the present disclosure may include a monoclonal antibody produced by the hybridoma cell having accession number KCTC18596P and/or a monoclonal antibody produced by the hybridoma cell having accession number KCTC18598P provided according to the present disclosure.

The kit of the present disclosure may further include compositions, solutions, or devices each having one or more other components suitable for the assay method.

A second aspect of the present disclosure relates to an information providing method of diagnosing hepatocellular carcinoma, the information providing method including:
(a) measuring a level of mRNA of CRBN gene or protein expressed therefrom in a biological sample separated from a subject; and
(b) comparing the measured level with that of a level measured in a biological sample separated from a normal subject.

The information providing method of diagnosing hepatocellular carcinoma according to the present disclosure may further include (c) determining as hepatocellular carcinoma, when the level of mRNA or protein expressed therefrom measured in the biological sample of step (a) is higher than that of measured in a biological sample separated from a normal subject or the subject of step (a).

The term "measurement of expression level of mRNA" used herein refers to a process of confirming the presence and expression level of mRNA of CRBN gene in a biological sample, which can be performed by measuring the amount of CRBN. To this end, the analysis method includes RT-PCR, competitive RT-PCR, real-time RT-PCR, RNase protection method, northern blotting, or DNA chip technology, and the like, but the method is not limited thereto.

In the present disclosure, the term "measuring protein expression level" is a process of confirming the presence and expression degree of a protein expressed from the CRBN gene in a biological sample, and the amount of the protein can be confirmed by using an antibody binding specifically to the protein expressed in the gene. To this end, the analysis method may include western blotting, enzyme linked immunosorbent assay (ELISA), radioimmunoassay (RIA), radial immunodiffusion, ouchterlony immunodiffusion, rocket immunoelectrophoresis, immunohistochemical staining, immunoprecipitation assay, complement fixation assay, immunofluorescence, immunochromatography, fluorescence activated cell sorter (FACS) analysis, or protein chip technology, and the like, but is not limited thereto.

The term "biological sample" used herein may include tissues, cells, whole blood, sputum, serum, plasma, saliva, brain, skin, lymph nodes, spinal cord, cell culture supernatant, saliva, urine, ruptured eukaryotic cells, and bacterial expression systems, but is not limited thereto. These biological samples may be reacted with the monoclonal antibody of the present disclosure without or with being manipulated to identify the presence of CRBN protein or to perform the diagnosis and prognosis prediction of hepatocellular carcinoma.

The term "subject" as used herein may refer to any animal, including a human, that has or is likely to develop hepatocellular carcinoma. The animal may be, in addition to the human, a mammal, such as a cow, a horse, a sheep, a pig, a goat, a camel, a nutrient, a dog, a cat, or the like, which has similar symptoms thereto, but is not limited thereto.

The term "normal subject" as used herein refers to a subject who has not developed hepatocellular carcinoma or is not suspected of developing hepatocellular carcinoma.

According to the information providing method for the diagnosis of hepatocellular carcinoma of the present disclosure, the expression level of the CRBN gene can be measured at the mRNA level or the protein level, and the separation of mRNA or protein from a biological sample may be performed using a known process. An analysis method of measuring mRNA levels and an analysis method of measuring protein levels are the same as described above.

The information providing method for diagnosing hepatocellular carcinoma of the present disclosure may be performed using a monoclonal antibody produced by the hybridoma cell having accession number KCTC18596P and/or a monoclonal antibody produced by the hybridoma cell line having accession number KCTC18598P, which are provided in the present disclosure.

Therefore, as an embodiment of the present disclosure, the present disclosure provides an information providing method for diagnosis or prognosis prediction of hepatocellular carcinoma, the information providing method including detecting, using a monoclonal antibody, through an antigen-antibody reaction, CRBN protein of the biological sample of a subject suspected of hepatocellular carcinoma or a subject whose prognosis after hepatocellular carcinoma surgery is to be identified.

According to the information providing method for diagnosis or prognosis prediction of hepatocellular carcinoma according to the present disclosure, CRBN protein may be detected by reacting a monoclonal antibody specific to CRBN of the present disclosure with separated biological sample of a subject suspected of having hepatocellular carcinoma or a hepatocellular carcinoma patient, and detecting the formation of an antigen-antibody complex. Through the detection of CRBN protein, information for the diagnosis or prognosis prediction of hepatocellular carcinoma may be provided. Since CRBN is overexpressed in hepatocellular carcinoma, by comparing expression amounts with a control group such as normal cells or surrounding normal tissues, hepatocellular carcinoma can be diagnosed and prognosis after surgery can be predicted. However, embodiments of the present disclosure are not limited thereto.

The term "antigen-antibody complex" used herein refers to a combination of an CRBN protein antigen in a sample and a monoclonal antibody according to the present disclosure recognizing the antigen, and the formation of the antigen-antibody complex may be detected by any method selected from the group consisting of a colorimetric method, an electrochemical method, a fluorometric method, a luminometry method, a particle counting method, a visual assessment method, and a scintillation counting method. However, the present disclosure is not necessarily limited thereto, and various modifications and applications may be made thereon.

In the present disclosure, various labels may be used to detect an antigen-antibody complex. Specific examples thereof may be selected from the group consisting of an enzyme, a fluorescent material, a ligand, a luminous material, a microparticle, and a radioactive isotope, but are not necessarily limited thereto.

The enzyme used as the detection label may include acetylcholinesterase, alkaline phosphatase, 3-D-galactosidase, horseradish peroxidase, β-lactamase, and the like. The fluorescent material used as the detection label may include fluorescein, $Eu^{3+}$, $Eu^{3+}$ chelate, cryptate, and the like. The ligand used as the detection label may include biotin derivative, and the like. The luminous material used as the detection label may include, acridinium ester, isoluminol derivative, and the like. The microparticle used as the detection label may include colloidal gold, colored latex, and the like. The radioactive isotope used as the detection label may include $^{57}Co$, $^{3}H$, $^{125}I$, $^{125}I$-Bolton Hunter reagent, and the like.

In an embodiment, the antigen-antibody complex may be detected using an enzyme-linked immunosorbent assay (ELISA). ELISA may include various ELISA methods such as direct ELISA using a labeled antibody recognizing an antigen attached to a solid support, indirect ELISA using a labeled secondary antibody recognizing a capture antibody in a complex of an antibody recognizing an antigen attached to the solid support, direct sandwich ELISA using another labeled antibody recognizing an antigen in a complex of an antibody and an antigen attached to the solid support, and indirect sandwich ELISA using another labeled secondary antibody recognizing an antigen after reacting with another antibody recognizing an antigen in a complex of an antibody and an antigen attached to the solid support.

The monoclonal antibody may have a detection label, and when the monoclonal antibody does not have the detection label, another antibody that captures the monoclonal antibody and has the detection label, may be used for the detection.

In an embodiment of the present disclosure, it was confirmed that the monoclonal antibody of the present disclosure specifically recognizes CRBN by using an antigen-antibody reaction, and in this regard, it was confirmed that the antibody of the present disclosure has excellent detection ability compared to commercially available CRBN polyclonal antibodies, thereby demonstrating that the antibody of the present disclosure can be useful for diagnosis or prognosis prediction of hepatocellular carcinoma.

A third aspect of the present disclosure relates to an information providing method for predicting the prognosis of hepatocellular carcinoma, the information providing method including:

(a) measuring a level of mRNA of CRBN gene or protein expressed therefrom in a biological sample separated from each of hepatocellular carcinoma tissue and its surrounding normal tissue of a hepatocellular carcinoma patient; and (b) corn paring the measured levels of the samples.

The information providing method for predicting the prognosis of hepatocellular carcinoma according to the present disclosure may further include (c) determining as poor prognosis, when the level of mRNA of CRBN gene or protein expressed therefrom measured in a biological sample separated from hepatocellular carcinoma tissue of step (a) is more than twice as much that of measured in a biological sample separated from normal tissue.

Regarding the information providing method for predicting the prognosis of hepatocellular carcinoma according to the present disclosure, when the level of mRNA of CRBN gene or protein expressed therefrom measured in a biological sample separated from hepatocellular carcinoma tissue of step (a) is more than twice as much that of measured in a biological sample separated from its surrounding normal tissue, the corresponding group may be classified as a CRBN high-expressed group, and when less than twice, the corresponding group may be classified as a CRBN low-expressed group. The level of the hepatocellular carcinoma biomarker of the biological sample separated from a patient of the CRBN high-expressed group, is additionally identified. By doing so, the accuracy of the prognosis prediction may be increased.

To this end, the information providing method for predicting the prognosis of hepatocellular carcinoma may further include:

(d-1) classifying the corresponding patient as a CRBN high-expressed patient group when the level of mRNA of CRBN gene or protein expressed therefrom measured in a biological sample separated from hepatocellular carcinoma tissue of step (a) is more than twice as much that of measured in a biological sample separated from its surrounding normal tissue, and classifying the corresponding patient as a CRBN low-expressed patient group when less than two times;

(d-2) measuring AFP (α-fetoprotein) levels in blood separated from the high expressed group patient and the low expressed group patient; and (d-3) determining the high expressed group patient as poor prognosis when the AFP level measured in blood separated from the high expressed group patient is higher than that of the AFP level measured in blood separated from the low expressed group patient.

According to an embodiment of the present disclosure, the expression level and/or expression pattern of mRNA of CRBN gene or protein expressed therefrom are measured from a plurality of patients with hepatocellular carcinoma, the measured values are stored as database together with the prognosis of the patients, and then, the prognosis can be predicted by inputting, into the database, the level and/or expression pattern of mRNA of CRBN gene or protein expressed therefrom of patients who want to know their prognosis. In this case, a known algorithm, a statistical analysis program, and the like, which are used for comparing the expression level or the expression pattern, may be used. In addition, the database may be further subdivided hepatocellular carcinoma patients according to a pathological stage, a treatment method the patients receive, and the like.

According to the information providing method for predicting the prognosis of hepatocellular carcinoma of the present disclosure, the expression level of the CRBN gene can be measured at the mRNA level or the protein level, and the separation of mRNA or protein from a biological sample may be performed using a known process. An analysis method of measuring mRNA levels and an analysis method of measuring protein levels are the same as described in connection with the information providing method for the diagnosis of hepatocellular carcinoma.

Through these analysis methods, the expression amount of mRNA of the CRBN gene or protein expressed therefrom, measured from a sample of a hepatocellular carcinoma patient having known prognosis, can be compared with the expression amount of mRNA of the CRBN gene or protein expressed therefrom, measured from a sample of a patient who wants to know his or her prognosis, and the increase or decrease in the expression amount may be used to predict the prognosis of a patient with hepatocellular carcinoma. That is, when expression-level comparison results show that the sample of the patient who wants to know his or her prognosis shows an expression level or an expression pattern similar to that of the sample of the patient whose prognosis is known to be good, it can be predicted that the patient who wants to know his or her prognosis would have good prognosis, and when expression-level comparison results show that the sample of the patient who wants to know his or her prognosis shows an expression level or an expression pattern similar to that of the sample of the patient whose prognosis is known to be bad, it can be predicted that the patient who wants to know his or her prognosis would have bad prognosis.

Therefore, according to the information providing method for predicting the prognosis of hepatocellular carcinoma of the present disclosure, the prognosis of hepatocellular carcinoma patients can be accurately predicted, and proper treatment planning can be made according to the predicted prognosis. For example, with respect to a patient determined to have good prognosis, a standard treatment or less invasive treatment options may be taken into consideration, and with respect to a patient determined to have bad prognosis, a treatment method used for a patient at the upper stage of the disease stage hepatocellular carcinoma or very aggressive or experimental treatment may be taken into consideration.

In the information providing method for predicting the prognosis of hepatocellular carcinoma of the present disclosure, the term "good prognosis" may refer to the case in which the disease does not progress to stage II, or microvascular invasion does not occur, or the cumulative tumor recurrence rate after surgery is low, or the survival rate after surgery is high. In contrast, the term "bad prognosis" may refer to a case in which it progresses to stage II, microvascular invasion occurs, a cumulative tumor recurrence rate after surgery is high, or a survival rate after surgery is low. The term "hepatocellular carcinoma patient having known prognosis" refers to a patient who is diagnosed with hepatocellular carcinoma and whose progress of disease has been known, and may be, for example, a patient who has been confirmed to have bad prognosis due to recurrence after surgery due to hepatocellular carcinoma or a patient who has been confirmed to have good prognosis due to survival or complete recovery without recurrence after surgery. The prognosis of a patient who wants to know his or her prognosis can be accurately predicted by obtaining and comparing the expression level or expression pattern of mRNA of the CRBN gene or protein expressed therefrom in samples taken from patients having known prognosis and samples taken from patients who want to know their prognosis.

Regarding the information providing method for predicting the prognosis of hepatocellular carcinoma according to the present disclosure, the progression to "stage II", which appears in "bad prognosis", follows the AJCC classification, which is one of the commonly used staging systems of hepatocellular carcinoma, and the AJCC classification is known to be effective in classifying the prognosis of surgical patients (Ueno S et al., Hepatol Res 2002; 24: 395-403.) A patient predicted to have a bad prognosis according to the information providing method for predicting the prognosis of hepatocellular carcinoma according to the present disclosure may also refer to a progression to a higher stage according to, in addition to the AJCC classification, a UICC/AJCC, a Okuda stage classification, a CLIP (Cancer of the Liver Infectious Program) stage classification, a French stage classification, a CUPI (Chinese University Cognitive Index) classification, a JIS (Japan Integrated Staging) classification, and a BCLC (Barcelonna-Clinical Liver Cancer) stage classification.

In the method of providing information for predicting the prognosis of hepatocellular carcinoma of the present disclosure, "AFP" refers to alpha fetoprotein, and a blood (or serum) AFP measurement in the process of the tumor marker test is the most commonly used hepatocellular carcinoma diagnostic test. However, it is known that hepatocellular carcinoma has a clear limitation in prognosis prediction ability of the single biomarker due to oncological diversity and patient characteristics accompanied by cirrhosis.

The present inventors confirmed that the accuracy of diagnosis and prognosis prediction of hepatocellular carcinoma can be improved by detecting CRBN alone and CRBN and AFP in combination (Table 3), and accordingly, suggested a method of accurately diagnosing hepatocellular carcinoma at an early stage, and accurately and precisely predicting the prognosis of hepatocellular carcinoma patients after surgery, by detecting CRBN alone and CRBN and AFP in combination.

A fourth aspect of the present disclosure provides a monoclonal antibody that binds specifically to CRBN, and provides a monoclonal antibody produced by the hybridoma cells having accession No. KCTC18596P and/or a monoclonal antibody produced by the hybridoma cells having accession No. KCTC18598P that binds specifically to CRBN.

The term "monoclonal antibody" used herein refers to a single-molecule composition antibody molecule obtained from substantially the same antibody population, and such a monoclonal antibody exhibits single binding specificity and affinity for a specific epitope. Typically, an immunoglobulin has a heavy chain and a light chain, and each of the heavy chain and the light chain includes a constant region and a variable region (this region is also known as a domain. The variable regions of the light and heavy chains include three hypervariable regions called complementarity-determining region (hereinafter referred to as "CDRs") and four framework regions (FRs). The CDRs mainly serve to bind to epitopes of antigens. The CDRs of each chain are typically referred to as CDR1, CDR2, CDR3 sequentially starting from the N-term inus and are also identified by the chain in which the particular CDR is located.

Meanwhile, the monoclonal antibody may be in the form of a chimeric antibody or a humanized antibody which has reduced immunogenicity for application to a human body.

The term "chimeric antibody" used herein refers to an antibody in which a variable region of a mouse antibody and a constant region of a human antibody are recombined by a DNA recombination technique, and the chimeric antibody can be clinically used since an immune response thereof is significantly improved as compared with a mouse antibody.

The term "humanized antibody" used herein refers to an antibody in which all or a part of the CDR sequence of the mouse monoclonal antibody is grafted to a human antibody, and for example, the CDR of the mouse monoclonal antibody may be recombined with human antibody-derived FR to prepare a humanized variable region, which is then recombined with the constant region of the humanized antibody. However, embodiments of the present disclosure are not limited thereto. In addition, when only the CDR derived from the mouse is grafted, the affinity of the humanized antibody is decreased. Accordingly, the FR amino acid residues that may affect the three-dimensional structure of the CDRs may be substituted with the amino acid of the mouse antibody to improve the affinity. However, embodiments of the present disclosure are not limited thereto.

The term "monoclonal antibody binding specifically to CRBN (cereblon) protein" refers to an antibody that binds to CRBN protein to inhibit a biological activity of the CRBN protein, and may be used interchangeably with an anti-CBR antibody in the present specification.

As described above, the form of the monoclonal antibody of the present disclosure may include the whole antibodies and antibody fragments, and may be modified into a chimeric antibody or a humanized antibody.

The CRBN protein is known to inhibit phosphorylation (activation) of AMPK by directly binding to the a subunit in the AMPK trimer, which is an intracellular energy sensor. The present inventors found that the expression of CRBN significantly increased in hepatocellular carcinoma patients, and prepared monoclonal antibodies capable of specifically detecting CRBN. The monoclonal antibody of the present disclosure binds specifically to Pep2: C-DMEEFHGRTLHD (SEQ ID NO: 3) and/or Pep5: C-DRIKKQLREWDENLKD (SEQ ID NO: 6) of CRBN, and can specifically detect the amount of CRBN expression. Due to high sensitivity and specificity thereof in diagnosing hepatocellular carcinoma or predicting prognosis after surgery, the monoclonal antibody can be usefully used for diagnosis and prognosis prediction of hepatocellular carcinoma. In an embodiment of the present disclosure, a monoclonal antibody binding specifically to CRBN of the present disclosure was prepared by using, as an antigen protein, a fusion protein including CRBN amino acid Pep2: C-DMEEFHGRTLHD (63-74 aa) (SEQ ID NO 3), CRBN amino acid Pep4: C-GRQRFKVLELRTQSD (161-175 aa) (SEQ ID NO 5), or CRBN amino acid Pep5: C-DRIKKQLREWDENLKD (255~270aa) (SEQ ID NO 6) (Example 1).

According to an embodiment of the present disclosure, it was confirmed that the monoclonal antibody provided in the present disclosure not only binds specifically to CRBN but also has a remarkably strong binding force compared to the commercially available CRBN polyclonal antibody. It was confirmed that the monoclonal antibody of the present disclosure is remarkably overexpressed in hepatocellular carcinoma cells compared to surrounding normal tissues, and reduces the activity of cancer metastasis-related MMP-2 and MMP-9 in hepatocellular carcinoma cell lines in which CRBN expression is inhibited, while increasing the activity of MMP-9 in CRBN-overexpressing hepatocellular carcinoma cell lines in CRBN protein-dependent manner. Further, the patients were classified into a high-expressed group and a low-expressed group according to the amount of CRBN expression and clinical indicators thereof were tracked. As a result, it was confirmed that the progression of hepatocellular carcinoma staging, survival rate following hepatocellular carcinoma surgery, and tumor recurrence rate could be predicted at a meaningful level.

The fourth aspect of the present disclosure provides a method of preparing the monoclonal antibody described above.

The monoclonal antibody of the present disclosure can be easily prepared by a known method of preparing a monoclonal antibody. For example, the method of preparing a monoclonal antibody may be performed by preparing a hybridoma using B lymphocytes obtained from an immunized animal (Koeher and Milstein, 1976, Nature, 256: 495) or may be performed by using a phage display technique, but is not limited thereto.

The monoclonal antibody of the present disclosure may be obtained from hybridoma cells produced by a cell fusion method known in the art. In general, hybridoma cells that secrete monoclonal antibodies are produced by fusing a cancer cell line with an immune cell from an immunologically suitable host animal, such as a mouse injected with an antigen protein. The fusion of the two cells is performed by using a known method using polyethyleneglycol in the art and the antibody producing cells are proliferated by a standard culture method. After obtaining a uniform cell population by performing sub-cloning by limited dilution, a large volume of hybridoma cells capable of producing an antibody specific to an antigen are cultured in vitro or in vivo.

As the myeloma cell used for cell fusion, various cell lines such as mouse-derived p3/x63-Ag8, p3-U1, NS-1, MPC-11, SP-2/0, F0, P3x63 Ag8, V653, S194, rat-derived R210, and the like may be used. The cell line used in embodiments of the present disclosure may be myeloma cell SP-2/0.

The monoclonal antibody produced by the hybridoma cell may be used without purification, and may also be with high-degree purification obtained using various conventional methods, for example, dialysis, salt precipitation, ion exchange chromatography, size exclusion chromatography, affinity chromatography, and the like.

In order to select a monoclone that selectively recognizes CRBN protein, various commonly used methods such as radioimmunoassay (RIA), enzyme immunoadsorption (ELISA), immunofluorescence, western blotting, flow cytometry, and the like may be used, but are not limited thereto. According to an embodiment of the present disclosure, a monoclone is selected by ELISA.

The monoclonal antibody of the present disclosure may be prepared by a phage display method known in the art. An antibody library using phage display technology is obtained in such a manner that an antibody gene is directly obtained from B lymphocytes without preparing a hybridoma and an antibody is expressed on a phage surface. Using phage display technology may overcome many existing difficulties associated with generating monoclonal antibodies by B-cell immortalization. In general, phage display technology includes: 1) inserting a random sequence oligonucleotide into a gene region corresponding to a coat protein pIII (or pIV) N-terminus of phage; 2) expressing a fusion protein of a portion of the native coat protein and the polypeptide encoded by the random sequence oligonucleotide; 3) treating a receptor material capable of binding to the polypeptide encoded by the oligonucleotide; 4) eluting peptide-phage particles bound to a receptor by using a low pH or binding-competitive molecules; 5) amplifying the phage eluted by panning in a host cell; 6) repeating the method to obtain the desired amount; and 7) determining the sequence of the active peptide from among the DNA sequences of phage clones selected by panning.

In an embodiment, the monoclonal antibody of the present disclosure may be prepared from hybridoma cells.

Polynucleotides encoding monoclonal antibodies or phage display clones derived from hybridomas of the present disclosure may be easily separated and sequenced using conventional procedures. For example, oligonucleotide primers designed to specifically amplify the heavy chain and light chain coding regions of interest from hybridoma or phage template DNA may be used. Once the polynucleotide is separated, the separated polynucleotide may be placed into an expression vector, and then the expression vector is introduced into an appropriate host cell to produce a target monoclonal antibody from the transformed host cell (i.e., the transformant). Therefore, the method of preparing a monoclonal antibody according to the present disclosure may include amplifying an expression vector including a polynucleotide encoding a monoclonal antibody. However, embodiments of the present disclosure are not limited thereto.

Hereinafter, the present disclosure will be described in more detail through Examples. These embodiments are only intended to show examples of the present disclosure, and it will be apparent to those skilled in the art that the scope of the present disclosure is not construed as being limited by these embodiments.

MODE OF DISCLOSURE

Example 1

Production of Cereblon (CRBN) Antigen
1-1. Selection of Antigenic Peptide from CRBN Sequence In order to select an antigen peptide sequence suitable for the production of monoclonal antibodies from the human CRBN protein sequence represented by SEQ ID NO: 1, hydrophilic and hydrophobic measurements of each sequence were performed.

As a result, it was found that the peptide sequences represented by SEQ ID NO: 3 (PEP2), SEQ ID NO: 5 (PEP4), and SEQ ID NO: 6 (PEP5) had high possibility for the production of monoclonal antibodies.

```
                                            [SEQ ID NO: 2]
Prediction 1: C-EDEMEVEDQDSKEAK (28-42aa, 16mer)

[SEQ ID NO: 3]
Prediction 2: C-DMEEFHGRTLHD (63-74aa, 13mer)

[SEQ ID NO: 4]
Prediction 3: C-EIYAYREEQDFGIE (140-153aa, 15mer)

[SEQ ID NO: 5]
Prediction 4: C-GRQRFKVLELRTQSD (161-175aa, 16mer)

[SEQ ID NO: 6]
Prediction 5: C-DRIKKQLREWDENLKD(255-270aa, 17mer)
```

1-2. Antigen Production

The synthesized peptide was conjugated to KLH (Keyhole limpet hemocyanin) and BSA (Bandeiraea simplicifolia agglutinin) using SMCC (Succinimidyl 4-(N-maleimidomethyl)cyclohexane-1-carboxylate), and then ELISA screening was performed thereon.

Example 2

Construction of Hybridoma Cell
2-1. Immunization of Mice for Production of Monoclonal Antibody-Producing Cell Lines In order to obtain an immunized mouse required for the preparation of hybridoma cells, the recombinant CRBN antigen proteins PEP2, PEP4, and PEP5 (30 µg/µℓ each) prepared in Example 1 were mixed together and diluted with 150 µℓ of a phosphate buffered saline (PBS), mixed with the same amount of complete Freund's adjuvant (Sigma), thereby producing emulsion. The emulsion was injected in an amount of 200 µℓ, for each dosage, into the abdominal cavity of BALB/C (female, 8-week-old) mice 4 times at intervals of 3 weeks. One month after the fourth immunization, three days after the administration of the purified recombinant CRBN protein through tail vein, spleen was extracted and used for cell fusion.

2-2. Cell Fusion

For cell fusion, myeloma cells were prepared. SP2/O cells, which are myeloma cells, were cultured and cell density was set to 2.5 to 5×10$^4$ cells/Mℓ. SP2/O cells were prepared by dilution to ⅓, 24 hours before cell fusion.

Cell fusion was performed according to a general method using polyethylene glycol (Ed Harlow, David Lane: Antibodies, A laboratory manual. Cold Springs Harbor press, 1988 P139-244) as follows.

After confirming the titer of the antibody by the ELISA method in the serum of the immunized mouse in Example 2-1 to confirm the antibody production ability, the immunized mouse was anesthetized with ether and the spleen cells located on the left side of the body were extracted therefrom. Splenocytes in the extracted spleen were separated using a cell strainer (Falcon, USA) and diluted to a concentration of $1\times10^8$ cells/Mℓ. $1\times10^7$ cells/Mℓ of myeloma cells and 1 Mℓ of PEG1500 (Sigma, USA) were mixed and fused. The fused cells were diluted in 200 Mℓ of HAT (Sigma, USA) medium, and then, 100 μℓ of the diluted cells were distributed to each well of the 96 well microplate, and cultured in a 37° C. incubator supplied with 5% carbon dioxide.

2-3. Selection and Cloning of Hybridoma Cells Producing Monoclonal Antibodies

An enzyme immune method was used to select fusion cells specifically reacting only to CRBN from among the fusion cell groups prepared in Example 2-2, and to confirm the generation of antibodies.

Media were exchanged 8-9 days after cell fusion and incubated at cDMEM2 from 96 wells to 24 wells until the cells were grown well. On the 5$^{th}$ to 7$^{th}$ day after the medium was exchanged, the supernatant of the well, of which color had changed, collected, and the well was filled with cDMEM2, and then ELISA test was performed thereon. After ELISA test, wells were selected and transferred to a 24-well and cultured therein. After culturing in 24 wells, ELISA test was performed again. Specifically, the concentration of the fused cells in the 24-well was confirmed, and the fused cells were diluted with 15 Mℓ of culture fluid to 0.5 cells/well in a 96-well plate. The fused cell diluted solution was dispensed in an amount of 150 μℓ per well. The wells containing 1 cell were checked by microscopic examination. The supernatant of the well, in which the cells were grown to a certain extent, was collected and confirmed by ELISA and western blotting to perform the first screening. The fusion cells selected based on the first screening were transferred to and cultured in 24 wells, centrifuged, and the supernatant was collected, confirmed by ELISA and western blotting to perform the second screening. The 450 nm absorbance (0. D value) of the fused cells grown in 24 wells was confirmed by ELISA, only the fused cells having an absorbance of 1 or more were selected and transferred to a 25T/C culture flask and cultured and centrifuged, and the supernatant thereof was collected, and confirmed by ELISA and western blotting to perform a third screening. The fusion cells selected based on the third screening were transferred to a 75T/C culture flask and cultured, and the absorbance of the cells was confirmed by ELISA to select only fusion cells that had an absorbance of 1 or more. The finally selected fusion cells were designated as 1 D3 and 4E11, and were deposited at the Korea Research Institute of Bioscience and Biotechnology Gene Bank (KCTC) on the date of Aug. 30, 2017 (Accession numbers: KCTC18596P (4E11), KCTC18598P (1 D3)).

Example 3

Production and Purification of Monoclonal Antibodies with Respect to CRBN 3-1. Production of Monoclonal Antibody with Respect to CRBN In order to produce the monoclonal antibody with respect to CRBN from the final hybridoma cells ("1D3" and "4E11") selected in Example 2, 500 μℓ of pristane was injected into an abdominal cavity of 7 to 8-week female Balb/C mouse at 7-8 weeks of age. The fusion cells cultured in a 75T/C culture flask were collected, centrifuged, and the supernatant was removed therefrom, put in a phosphate buffered saline, and pipetted. 7 to 10 days after the administration of the pristane, the fusion cells [1D3 and 4E11] selected in Example 2 were injected in the cell population of at $8\times10^5$ to $4\times10^7$ into the abdominal cavity of the mouse. When the abdominal cavity of the mouse was filled with ascites after 5 to 7 days, the ascites was extracted using an 18 G needle. Ascites was kept at 4° C. overnight, and were centrifuged the next day to remove lumps containing yellow fat and only the supernatant was separated therefrom. The separated supernatant was dispensed and stored at −20° C.

3-2. Purification of Monoclonal Antibody with Respect to CRBN

A column was filled with an appropriate amount of the protein G fast flow bed stored in the stock solution (20% ethanol), 20% ethanol was dropped therethrough, and washed with 5 Bed Volume of binding buffer (20 mM sodium phosphate, pH 7.0). An appropriate amount of ascites was diluted with phosphate buffered saline, and then loaded onto protein G column. After binding with 3 bed volume of binding buffer (20 mM sodium phosphate, pH 7.0), fractions were eluted with 3 Bed Volume of elution buffer (0.1 M glycine buffer, pH 3.0-2.5), wherein the amount of each of the fractions was 0.5 Mℓ. Each fraction was neutralized with 35 μℓ neutralization buffer (1 M Tris-HCl, pH 9.0).

After being left with 70% ethanol overnight at refrigeration temperature, it was refrigerated again in a stock solution (20% ethanol) until next use. In order to confirm the purity of each fraction, SDS-PAGE was performed, and desalting was performed with a Ammersharm GE column.

As a result, from 1130 μg of ascites, 1938 μg of the monoclonal antibody with respect to CRBN was purified using the protein G column, and the amount of the monoclonal antibody with respect to CRBN from which the salt was removed using the GE column, was 1309 μg. The recovery rate was 11.7%.

Example 4

Binding Specificity Experiments of Hybridoma Cells (1D3 and 4E11) with Respect to CRBN Antigen—ELISA The binding specificity of the hybridoma cells (1D3 and 4E11) of the present disclosure with respect to CRBN antigens (PEP2, PEP4 and PEP5), was confirmed through ELISA experiment.

The binding specificity of the hybridoma cells (1D3 and 4E11) with respect to CRBN antigens (PEP2, PEP4 and PEP5) was confirmed by ELISA. Results thereof are shown Table 1.

TABLE 1

|  | PEP2 | PEP4 | PEP5 | Control group |
|---|---|---|---|---|
| 1D3 | 1.511 | 0.062 | 0.229 | 0.068 |
| 4E11 | 1.270 | 0.091 | 0.827 | 0.079 |

Therefore, it was confirmed that both of the hybridoma cells (1 D3 and 4E11) of the present disclosure bind to the CRBN-derived peptide, and in particular, it was found that the 4E11 clone cross-reacts with PEP2 and PEP5.

Example 5

Selection of Monoclonal Antibody by Isotyping

ELISA was performed to determine an isotype of the monoclonal antibody prepared in Example 3. In detail, a purified antibody with respect to each mice isotype, produced from a rabbit, was diluted with carbonate buffer (pH 9.4) at a concentration of 10 µg/Mℓ, and then, 100 µℓ thereof was added at 100 µℓ per well to the Maxisorp ELISA plate (Nunc, USA), and reacted at 4° C. for 16 hours to coat the antibody. Wells coated with the respective isotype antibodies were treated with a blocking buffer (PBS, 0.05% Tween-20, 1% BSA, 3% thermal inert horse serum) containing 1% BSA to block the non-specific reaction at 37° C. for 1 hour. To each well, 50 µℓ of monoclonal antibody-producing hybridoma cell culture solution was added, reacted at 4° C. for 1 hour, and then washed three times with washing buffer (PBS, 0.05% Tween-20, 0.05% BSA). Horseradish peroxidase (HRP)-condensed anti-mouse IgG+IgA+IgM antibody (1:2000, Sigma, USA) diluted 1:1000 times after washing, was added in 100 per well, reacted at 37° C. for 1 hour, and washed three times with washing buffer. After washing, a TMB (3, 3', 5, 5'-tetramethylbenzidine) (Sigma, USA) substrate solution was added to each well in 100 µℓ per well, the reaction was caused to occur in dark for 30 minutes to develop color, followed by treatment with 2N $H_2SO_4$ to stop the enzymatic reaction. After the reaction, absorbance was measured at 450 nm using an ELISA reader (Perkineelmer Victor X3). Results thereof are shown in Table 2.

As shown in Table 2 below, as a result of analyzing the isotypes, it was confirmed that the isotypes were classified according to the subclasses of heavy chains, and that all of the monoclonal antibodies produced in the four types of hybridoma cells were IgG1/Kappa subtypes.

TABLE 2

|  | 1D3 | 4E11 |
|---|---|---|
| IgG1 | 2.792 | 2.412 |
| IgG2a | 0.269 | 0.164 |
| IgG2b | 0.064 | 0.051 |
| IgG3 | 0.080 | 0.058 |
| IgA | 0.090 | 0.065 |
| IgM | 0.226 | 0.107 |
| Kappa | 2.555 | 0.606 |
| Lambda | 0.082 | 0.068 |

Example 6

Immunohistochemistry for CRBN Expression Identification

With the approval of the Clinical Trial Review Committee of Asan Medical Center, of patients who underwent surgery for hepatocellular carcinoma at Asan Medical Center in Seoul from September 2009 to December 2011, 40 patients corresponding to Stage I and Stage II defined according to AJCC (The American Joint Committee on Cancer) Version 7 were selected, and their liver cancer tissues and surrounding normal liver tissues after surgery, which had been stored at Asan Medical Center Bio-Resource Center, were obtained for use in experiments.

Hepatocellular carcinoma tissue and surrounding normal liver tissue were cut in a frozen state to the size of 5 µm by using microtome, and then fixed on a slide with 4% paraformaldehyde in a phosphate buffer (77.4 ml of 1 M $Na_2HPO_4$, 22.6 ml of 1 mM $Na_2HPO_4$, and 900 ml of distilled water) at room temperature for 30 minutes. The fixed tissues were permeabilized with 0.5% Triton X-100 (Merck, Darmstadt, Germany) for 5 minutes, and cultured with a solution in which 2% normal goat serum (NGS) was added to 2% normal goat serum (NGS) and phosphate-buffered saline (PBS) for 1 hour at room temperature to be blocked. Then, the cells were cultured with primary antibody (E-cadherin, 1:500, Cell Signaling Technology, Danvers, MA, USA and N-cadherin, 1:500, Abcam) overnight at 4° C. The primary antibody was detected by fluorescein isothiocyanate (FITC) or CY3 (cyanin) (Invitrogen, Carlsbad, Calif., USA), and was bound to anti-rabbit (anti-rabbit, 1:500, Invitrogen) or anti-mouse (anti-mouse, 1:2000, Invitrogen), which was the secondary antibody, at room temperature for about 1 hour. The CRBN expression levels in the normal group and the hepatocellular carcinoma group were compared using a fluorescence microscope (fluorescence microscope, Leica, Heidelberg, Germany). Results thereof are shown in FIG. 1.

Figure 1:
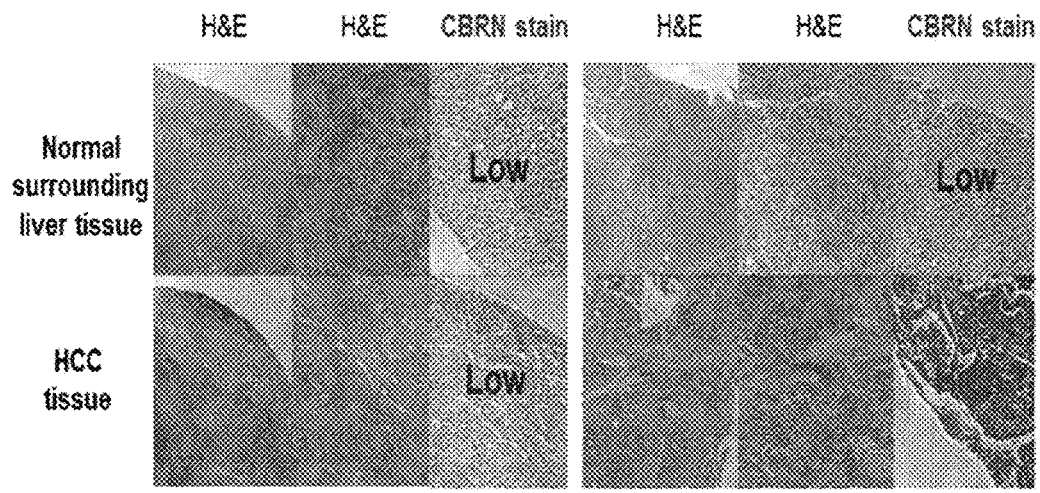
FIG. 1 shows an image of the tumor cell tissue of hepatocellular carcinoma and the normal cell tissue of the periphery thereof, of which the expression level of CRBN protein was confirmed by immunohistochemistry.

As shown in FIG. 1, when immunohistochemistry was performed in which the CRBN monoclonal antibody produced in Example 3 was applied on the frozen sections of hepatocellular carcinoma tissues and surrounding normal tissues, the expression of CRBN protein in hepatocellular carcinoma tissues was at least two times higher than that in normal liver tissues.

Example 7

Western Blot for CRBN Expression Quantification

Total protein was dissolved in a pro-prep protein extraction solution (iNtRON Biotechnology, Boca Raton, FL, USA) at −20° C. for 30 minutes, and cultured and extracted. The lysate was centrifuged at 20,217×g for 5 minutes at 4° C. Protein concentration was measured using Standard Bradford Assay (Bio-Rad, Hercules, Calif., USA). 60 µg of the extracted protein was electrophoresed with 10% sodium dodecyl sulfate-polyacrylamide gel (SDS-PAGE) at room temperature and at 80 V to 120 V, and the separated protein was moved to a polyvinylidene fluoride (PVDF) membrane at 260 mA at 4° C. for 90 minutes and then fixed with 5% skim milk at room temperature for 1 hour. A primary antibody was added to the fixed cell membrane and incubated at 4° C. overnight. The primary antibody was prepared by diluting polyclonal CRBN antibody (Sigma) in 5% skim milk at a ratio of 1:1000, and as a control group, actin (anti-rabbit) was diluted in 5% skim milk at a ratio of 1:5000, and the resultant was cultured at 4° C. overnight, and then washed three times with 1×TBST (8.766 g of Nacl/1.211 g of Tris-base/500 µℓ of Tween 20) for 20 minutes. As a secondary antibody, an anti-mouse was diluted in 5% skim milk at a rate of 1:2000, cultured at room temperature for 2 hours, and then washed three times with 1×TBST for 20 minutes, and the protein band was visualized using an electrogenerated chemiluminescent (ECL) reagent (Millipore, Billerica, Mass., USA). The appropriate density of the band was analyzed by a reflectance concentration measurement of Bio-Rad GS-670 imaging densitometer.

Figure 2:
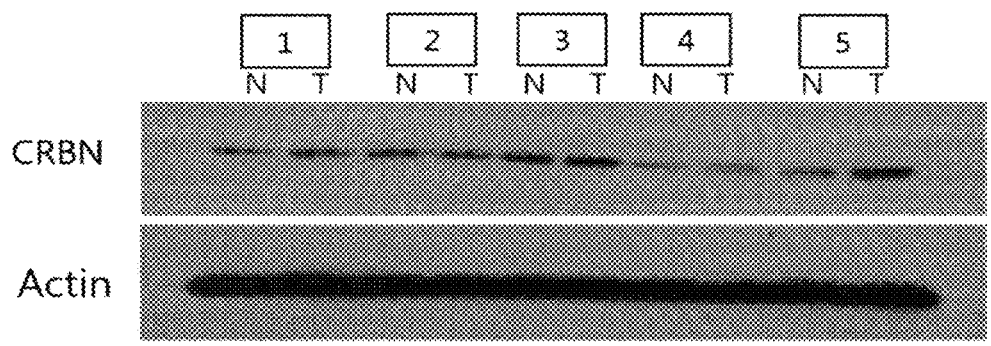
FIG. 2 shows CRBN expression levels in hepatocellular carcinoma tissue (T) and peripheral normal tissue (N), which were confirmed by western blotting.

Results thereof are shown in FIG. 2 indicate that the expression level of CRBN was higher in hepatocellular carcinoma tissue (T) than in surrounding normal liver tissue (N).

In the western blot analysis, when CRBN was measured to be at least two-fold higher in hepatocellular carcinoma tissue than in surrounding liver tissues, it was defined as a cut-off value of CRBN expression, and the patients were classified into a CRBN high-expression patient group and a CRBN low-expression patient group.

Example 8

Clinical Data Collection and Significance Analysis

The medical records of 40 patients were retrospectively examined. The age, sex, operation name, ICG value before the surgery, presence or absence of hepatitis B surface antibody, and AFP and PIVKA before the surgery, at the time of the surgery, were investigated. Based on a post-surgical tissue test, liver cirrhosis, the size and number of hepatocellular cancers, microvascular invasion, and the stage of the disease were examined. The disease-free period, recurrence, survival period, and survival period, after the surgery, were investigated.

First, the clinical indices, and the recurrence and survival after surgery, according to the expression level of CRBN protein, was identified. For the categorical variable, the Chi-Square test was used, and the serial variable was compared with the Student's t-test. Recurrence and survival rates were determined by the Kaplan-Meier method. A log-rank test was used for the comparison. It was determined that there was statistical significance when p-value was 0.05 or less.

The clinical and pathological characteristics of the patients under study were summarized in Table 3. It was confirmed by the western blot analysis of Example 7 that, in the case of 19 patients (CRBN high-expressed group), the expression of CRBN in hepatocellular carcinoma was at least two times that in the surrounding tissues, and in the case of 21 patients (52.5%) (CRBN low-expressed group), the expression of CRBN in hepatocellular carcinoma was less than 2 times that in the surrounding tissues.

TABLE 3

| Clinical pathological characteristics according to CRBN expression levels | | | | |
|---|---|---|---|---|
| | | CRBN high expression N = 19 (47.5%) | CRBN Low Expression N = 21 (52.5%) | p-value |
| Average age of patients, y, range | | 56.3 ± 5.7 | 53.1 ± 7.5 | 0.25 |
| Gender (male/female) | | 16/3 | 15/6 | 0.94 |
| Liver cirrhosis incidence, n (%) | | 15 (78.9) | 20 (95.2) | 0.120 |
| HBsAg (+), n (%) | | 19 (100) | 20 (95.2) | 0.335 |
| ICG-R15 before surgery, %, average | | 15.3 ± 6.2 | 16.4 ± 5.4 | 0.692 |
| Operation Name, n (%) | | | | 0.755 |
| | Right hepatectomy | 2 (10.5) | 1 (4.8) | |
| | Left hepatectomy | 1 (5.3) | 2 (9.5) | |
| | Right anterior sectionectomy | 5 (26.3) | 4 (19) | |
| | Right posterior sectionectomy | 4 (21.1) | 8 (38.1) | |
| | Left lateral sectionectomy | 1 (5.3) | 1 (5.3) | |
| | Left medial sectionectomy | 0 (0) | 1 (4.8) | |
| | Partial hepatectomy | 6 (31.6) | 4 (19) | |
| Tumor marker (pre-op) | | | | |
| | AFP, Average ng/mL | 929.9 ± 1595.8 | 198.1 ± 370.8 | 0.001 |
| | PIVKA II, Avg. mAU/mL | 1988.9 ± 4676.2 | 649.8 ± 1510.7 | 0.052 |
| Mean tumor size, cm | | 4.3 ± 2.3 | 3.6 ± 1.6 | 0.278 |
| Number of mean tumors, n | | 1 (100) | 1 (100) | |
| AJCC Stage, n (%) | | | | 0.005 |
| | Stage I | 13 (68.4) | 21 (100) | |
| | Stage II | 6 (31.6) | 0 (0) | |
| microvascular invasion (+), n (%) | | 6 (31.6) | 0 (0) | 0.005 |
| Stage BCLC, n (%) | | | | 0.087 |
| | Stage 0 | 0 (0) | 3 (14.3) | |
| | Stage A | 19 (100) | 18 (85.7) | |

TABLE 3-continued

Clinical pathological characteristics according to CRBN expression levels

|  | CRBN high expression N = 19 (47.5%) | CRBN Low Expression N = 21 (52.5%) | p-value |
|---|---|---|---|
| Number of tumor recurrence, n (%) | 14 (73.7) | 10 (47.6) | 0.093 |
| HCC-related death toll, n (%) | 10 (52.6) | 4 (19) | 0.026 |

When patients of the CRBN high-expressed group were compared with patients of the CRBN high-expressed group, there was no statistical difference between the two groups (p>0.05) in terms of gender, age at the time of surgery, degree of liver cirrhosis, hepatitis B surface antibody, and ICG-R15 value. There was no difference between the two groups (p=0.278) in terms of the size of the tumor found in the post-operative tissue test. However, the CRBN high-expressed group included more patients corresponding to stage II at a significant level (p=0.005). AFP, a marker for diagnosing hepatocellular carcinoma, was significantly highly measured in patients with high expression of CRBN (high expressed group: 929.9±1595.8 ng/mL; the low-expressed group: 198.1±370.8 ng/mL (p=0.001), and PIVKA-II were highly measured in the CRBN high-expression patient group, but did not show a statistical difference (high-expressed group: 1988.9±4676.2 mAU/mL; low expressed group: 649.8±1510.7 mAU/mL, p=0.052). Although microvascular invasion of hepatocellular carcinoma was not detected histologically in a patient group with low expression of CRBN, it was found in 31.6% of the CRBN high-expressed group (p=0.005).

From this, it was found that the expression level of CRBN in patients with hepatocellular carcinoma had a significant relationship with the expression level of AFP as a marker for hepatocellular carcinoma diagnosis, progress to stage II of AJCC, microvascular invasion, and survival.

In addition, the clinical pathological characteristics of patients classified as Stage I and II according to AJCC Version 7 were compared and summarized in Table 4.

Both AFP and PIVKA-II, which are diagnostic markers of hepatocellular carcinoma, were measured at significantly high levels in stage II patients (p=0.000), and in the case of stage I patients, there were more patients with low expression of CRBN (61.8%), but in the case of stage II patients, all patients belonged to the high expressed group of CRBN protein (p=0.005).

TABLE 4

|  | Stage I N = 34 (85%) | Stage II N = 6 (15%) | p-value |
|---|---|---|---|
| Average age of patients, y, range | 55.7 ± 6.6 | 49.8 ± 5.8 | 0.466 |
| Gender (male/female) | 25/9 | 6/0 | 0.152 |
| Liver cirrhosis, n (%) | 29 (85.3) | 6 (100) | 0.315 |
| HBsAg (+), n (%) | 33 (97.1) | 6 (100) | 0.671 |
| Average ICG R15, %, range | 15.8 ± 5.5 | 16.3 ± 7.6 | 0.354 |
| Operation Name, n (%) |  |  | 0.215 |
| Right hepatectomy | 1 (2.9) | 2 (33.3) |  |
| Left hepatectomy | 2 (5.9) | 1 (16.7) |  |
| Right anterior sectionectomy | 8 (23.5) | 1 (16.7) |  |
| Right posterior sectionectomy | 11 (32.4) | 1 (16.7) |  |
| Left lateral sectionectomy | 2 (5.9) | 0 (0) |  |
| Left medial sectionectomy | 1 (2.9) | 0 (0) |  |
| Partial hepatectomy | 9 (26.5) | 1 (16.7) |  |
| Tumor marker (pre-op) |  |  |  |
| AFP, Average ng/mL | 264.4 ± 539.8 | 2140 ± 2296.7 | 0.000 |
| PIVKA II, Avg. mAU/mL | 687.9 ± 1512.3 | 4674 ± 7754.1 | 0.000 |
| Mean tumor size, cm | 3.7 ± 1.5 | 4.9 ± 3.6 | 0.004 |
| Number of mean tumors, n | 1 (100) | 1 (100) |  |
| CRBN expression, n (%) |  |  | 0.005 |
| high expression | 13 (38.2) | 6 (100) |  |
| low expression | 21 (61.8) | 0 (0) |  |
| Stage BCLC, n (%) |  |  | 0.449 |
| Stage 0 | 3 (8.8) | 0 (0) |  |
| Stage A | 31 (91.2) | 6 (100) |  |
| Number of tumor recurrence, n (%) | 19 (55.9) | 5 (88.3) | 0.206 |
| HCC-related death toll, n (%) | 11 (32.4) | 3 (50) | 0.403 |

Example 9

Prognostic Prediction Analysis of CRBN Expression Levels

The CRBN high expressed group and the CRBN low expressed group classified in Example 7 were compared with each other in terms of the cumulative tumor recurrence rate and survival rate after hepatocellular carcinoma surgery.

Figure 3:
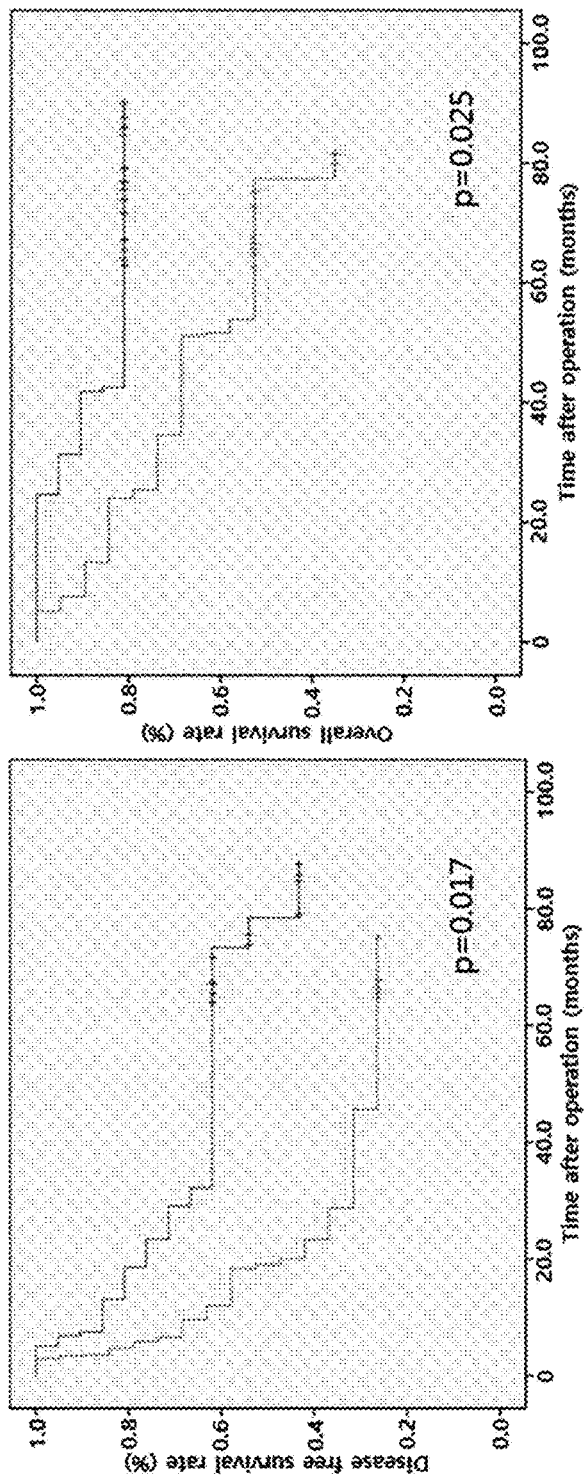
FIG. 3 shows a graph comparing the cumulative tumor recurrence rates (left) and patient survival rates (right) of the CRBN high expressed group (lower graph line) and the CRBN low expressed group (upper graph line).

As a result, as shown in FIG. 3, the cumulative tumor recurrence rate was significantly higher in the CRBN high-expressed group than in the CRBN low-expressed group ((A) of FIG. 3, p=0.017), and the patient survival rate was significantly lower ((B) of FIG. 3, p=0.025).

Figure 4:
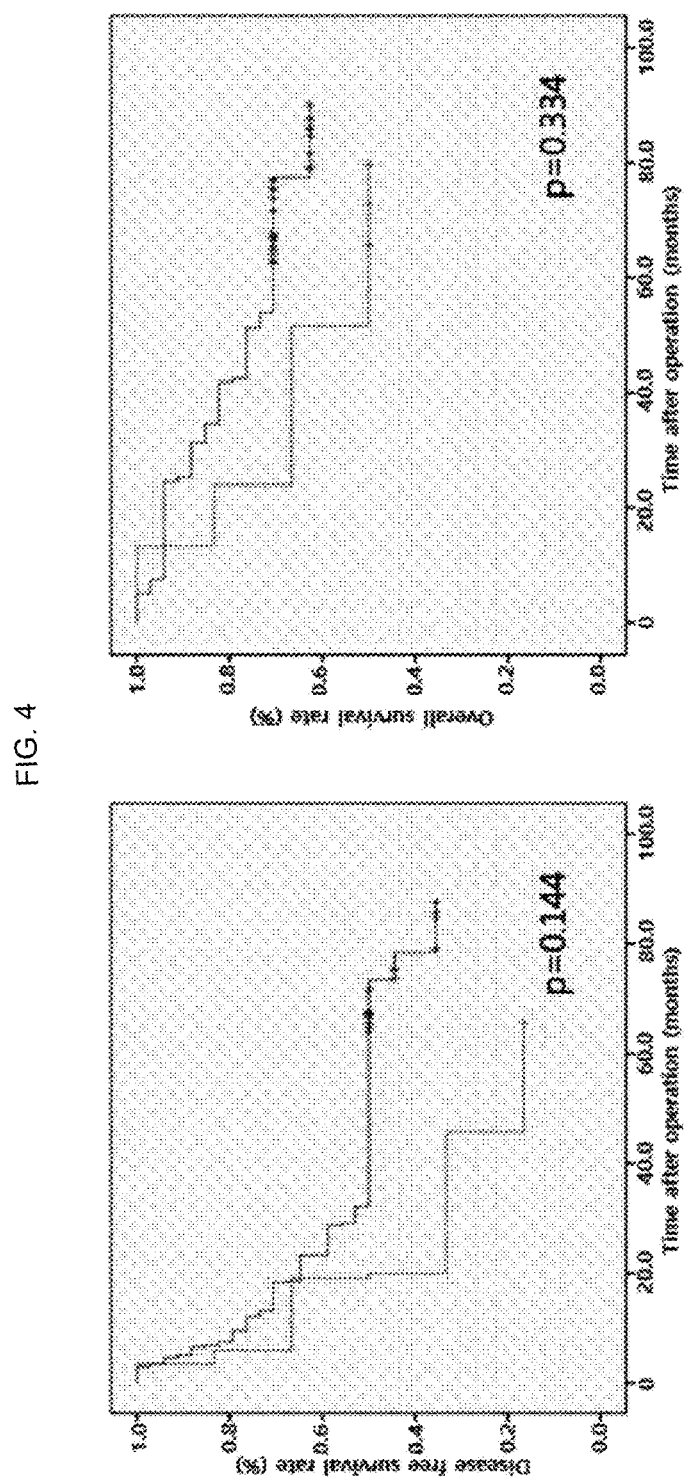
FIG. 4 shows a graph comparing cumulative tumor recurrence rates (left) and patient survival rates (right) according to whether microvascular invasion occurs (a upper graph line: a patient group with no microvascular invasion, and a lower graph line; a patient group with microvascular invasion).

In order to determine how efficient the difference in the expression level of CRBN protein is in predicting the prognosis of hepatocellular carcinoma after surgery, the patient groups were compared in terms of the cumulative tumor recurrence rate and the survival rate after hepatocellular carcinoma surgery according to the occurrence of microvascular invasion, which determines whether or not to proceed with hepatocellular carcinoma. As a result, as shown in FIG. 4, both the cumulative tumor recurrence rate (p=0.114) and the patient survival rate (p=0.334) did not show a significant difference depending on the occurrence of microvascular invasion.

From this, it was confirmed that in predicting the postoperative prognosis of the patient, the expression level of the CRBN protein has better predictability than microvascular invasion, which is traditionally the most important prognostic factor in patients with stage I and stage II single hepatocellular carcinoma.

Example 10

Verification of CRBN Protein Expression Using Established Cell Lines
10-1. Cell Line Comparison in Terms of CRBN Expression and MMP-2 and MMP-9 Activity In order to compare CRBN expression levels in different liver cells, Western blot analysis was performed on three cell lines by the method of Example 6, and the cell lines to be tested are as follows.
  i) Chang Liver (HeLa derivative) cell line (Sigma-Aldrich): normal hepatocyte-like cell line derived from HeLa
  ii) HepG2 cell line (Korean Cell Line Bank): the most representative cell line for studying human liver models, obtained from hepatoblastoma of 15-year-old men.
  iii) Hepa1c1c7 cell line (CRL-2026): mouse-derived liver cancer cell line As a result, as shown in (A) of FIG. 5, the expression of CRBN was increased in each of the human normal hepatocyte cell line Chang Liver, the human hepatoma cell line HepG2, and the mouse hepatoma cell line Hepa1c1c7, and the expression levels of CRBN were increased in the tumor cells HepG2 and Hepa1c1c7 compared to the normal cell Chang Liver. From this, it can be seen that the expression level of CRBN in liver cancer cells is higher than that in normal liver cells, and it is considered that the expression of CRBN protein was increased during or after the cancerous progression of the cells.

In addition, in order to identify tumor characteristics of these cell lines, activity analysis of cancer metastasis-related proteins, MMP-2 and MMP-9, was performed in each cell line. As a result, as shown in (B) of FIG. 5, the activity of MMP-9, which is a cancer metastasis-related protein, was increased in the hepatocellular carcinoma cell line (HepG2, Hepa1c1c7) having high CRBN protein expression.

10-2. MMP-2 and MMP-9 Activity Changes According to CRBN Expression Level

In order to confirm the expression amount of CRBN and the change in the activity of the cancer metastasis protein, the activity of MMP-2 and MMP-9 was confirmed after inhibiting or overexpressing CRBN protein expression.

Specifically, the change in the expression level of CRBN protein was examined through western blot analysis 24 hours after transfection into human liver cancer cell line (HepG2) and human-derived liver cell cancer primary culture cells, by using siRNA CRBN (251, Genolution) or Ha-CRBN (pCDNA 3, Genolution). Gelatin zymography is a technique using a phenomenon in which, when electrophoresis is performed on a gelatin-containing polyacrylamide gel, gelatin in the gel is decomposed by proteases included in tissues, and after the gel is stained, the gelatin remains a transparent band. In the case of MMP-2 and MMP-9, 72 kDa and 95 kDa can be simultaneously identified on the gel. Accordingly, it is easy to check whether MMP-2 and MMP-9 are activated. A 10% SDS-polyacrylamide gel (8×10 cm) containing 1% gelatin (Sigma, USA) was prepared, and together with a control group, 15 µℓ of the sample, prepared by mixing 5 µℓ of a 3× loading buffer [pH 6.8, 62 mM Tris-HCl, 2% SDS, 10% glycerol, 0.05% bromophenol blue] with 10 µℓ of a sample, was loaded on the gel. Then, electrophoresis was performed thereon at 100 V at a vertical electrophoresis unit (Hoefer, USA) for 4 hours. The gel was washed twice with 2.5% Triton X-100 solution for 30 minutes, and then a collagenase buffer [50 mM Tris, 5 mM CaCl2, 1% Triton X-100] was added thereto, and the resulting mixture was placed on a 37° C. shaker. After 24 hours, the gel was washed once with 2.5% Triton X-100 solution, stained with Coomassie Blue solution [1% Coomassie brilliant blue R250, 30% methanol, 10% acetic acid] for 2 hours, and decolorized twice with decolorizing solution [30% methanol, 10% acetic acid] for 30 minutes.

As a result, when human hepatoblastoma cell line HepG2 was treated with siRNA CRBN to inhibit the expression of CRBN ((A) of FIG. 6), the activities of cancer metastasis enzymes MMP-2 and MMP-9 were reduced ((B) of FIG. 6). This indicates that the CRBN protein modulates the activities of MMP-2 and MMP-9, which are hepatocellular carcinoma metastasis-related proteins, in hepatocellular carcinoma cell lines.

On the contrary, when HA-CRBN (pCDNA 3) was introduced into primary culture cells separated from human-derived hepatocellular carcinoma to overexpress CRBN protein (FIG. 7(A)), it was confirmed that the activity of MMP-9 was increased according to the increase in CRBN expression. On the other hand, in the case of MMP-2, it was not able to confirm significant increase regardless of CRBN overexpression ((B) of FIG. 7).

From these results, it can be seen that, in the in vitro experiments of normal or hepatoma cell lines and primary cultured cancer cells, the expression of CRBN protein in hepatoma cells was significantly increased compared to normal hepatocytes, and the increased CRBN protein was involved in regulating the activity of MMP-9 associated with cancer metastasis.

Example 11

Confirmation of Tumor Growth Using CRBN Knock Down Primary Cell Line

In order to confirm the change in tumor growth according to CRBN expression in vivo, a primary hepatocellular carcinoma cell line (CRBN KD-HCC) with CRBN knock-down was established using shRNA CRBN (251, Genolusion), and this hepatocellular carcinoma cell line was transplanted into Nude mice, and then compared with the CRBN WT-HCC-transplanted mice.

As shown in FIG. 8, it was confirmed that the tumor volume in the CRBN KD-HCC-transplanted mouse was significantly reduced compared to the tumor volume in the CRBN WT-HCC-transplanted mouse, and these results show that the expression of CRBN affects tumor growth.

The national research and development projects that supported the present disclosure are as follows.
(1) [National Research and Development Projects Supporting the Present Disclosure]
  [Assignment Unique Number] 2018R1D1A1A02049905
  [Ministry name] Korea Research Foundation
  [Research Management Institute] Korea Research Foundation
  [Name of research project] Basic Research Project in Science and Engineering
  [Research Assignment Name] Cereblon-dependent Anti-Cancer Mechanism Study of Immunoregulatory Drugs in Multiple Myeloma
  [Contribution] ½

Ulsan University's Industrial-Academic Cooperation Group
[Research Period] May 1, 2018 to Apr. 30, 2021
(2) [National Research and Development Projects Supporting the Present Disclosure]
[Assignment Unique Number] NCCR-HA16C0014010019
[Ministry name] Ministry of Health and Welfare
[Research Management Institute] National Cancer Center
[Research Project Name] Research and Development Project to Promote Cancer Conquest
[Research Project Name] Study on the Selection Criteria of Therapeutic Agents According to Cereblon Protein Expression in Multiple Myeloma Treatment

[Contribution] ½
Ulsan University's Industrial-Academic Cooperation Group
[Research Period] May 1, 2016 to Apr. 30, 2019
Name of Depository Organization: Korea Research Institute of Bioscience and Biotechnology
Accession Number: KCTC18596P
Deposit date: Aug. 30, 2017
Name of Depository Organization: Korea Research Institute of Bioscience and Biotechnology
Accession number: KCTC18598P
deposited date: Aug. 30, 2017.

The invention claimed is:

1. A monoclonal antibody that specifically binds to cereblon (CRBN), produced by a hybridoma cell having accession number KCTC18596P or KCTC18598P.

2. The monoclonal antibody of claim 1, wherein the monoclonal antibody produced by hybridoma cell having accession number KCTC18596P binds specifically to a region of cereblon comprising at least one amino acid sequence selected from the group consisting of SEQ ID NO: 3 and SEQ ID NO: 6.

3. The monoclonal antibody of claim 1, wherein the monoclonal antibody produced by hybridoma cell having accession number KCTC18598P binds specifically to a region of cereblon comprising the amino acid sequence of SEQ ID NO: 3.

* * * * *

SEQUENCE LISTING

```
<160> NUMBER OF SEQ ID NOS: 7

<210> SEQ ID NO 1
<211> LENGTH: 442
<212> TYPE: PRT
<213> ORGANISM: Artificial
<220> FEATURE:
<223> OTHER INFORMATION: Human CRBN

<400> SEQUENCE: 1

Met Ala Gly Glu Gly Asp Gln Gln Asp Ala Ala His Asn Met Gly Asn
1               5                   10                  15

His Leu Pro Leu Leu Pro Ala Glu Ser Glu Glu Glu Asp Glu Met Glu
                20                  25                  30

Val Glu Asp Gln Asp Ser Lys Glu Ala Lys Lys Pro Asn Ile Ile Asn
            35                  40                  45

Phe Asp Thr Ser Leu Pro Thr Ser His Thr Tyr Leu Gly Ala Asp Met
    50                  55                  60

Glu Glu Phe His Gly Arg Thr Leu His Asp Asp Asp Ser Cys Gln Val
65                  70                  75                  80

Ile Pro Val Leu Pro Gln Val Met Met Ile Leu Ile Pro Gly Gln Thr
                85                  90                  95

Leu Pro Leu Gln Leu Phe His Pro Gln Glu Val Ser Met Val Arg Asn
                100                 105                 110

Leu Ile Gln Lys Asp Arg Thr Phe Ala Val Leu Ala Tyr Ser Asn Val
            115                 120                 125

Gln Glu Arg Glu Ala Gln Phe Gly Thr Thr Ala Glu Ile Tyr Ala Tyr
    130                 135                 140

Arg Glu Glu Gln Asp Phe Gly Ile Glu Ile Val Lys Val Lys Ala Ile
145                 150                 155                 160

Gly Arg Gln Arg Phe Lys Val Leu Glu Leu Arg Thr Gln Ser Asp Gly
                165                 170                 175

Ile Gln Gln Ala Lys Val Gln Ile Leu Pro Glu Cys Val Leu Pro Ser
            180                 185                 190

Thr Met Ser Ala Val Gln Leu Glu Ser Leu Asn Lys Cys Gln Ile Phe
    195                 200                 205

Pro Ser Lys Pro Val Ser Arg Glu Asp Gln Cys Ser Tyr Lys Trp Trp
    210                 215                 220

Gln Lys Tyr Gln Lys Arg Lys Phe His Cys Ala Asn Leu Thr Ser Trp
225                 230                 235                 240

Pro Arg Trp Leu Tyr Ser Leu Tyr Asp Ala Glu Thr Leu Met Asp Arg
                245                 250                 255

Ile Lys Lys Gln Leu Arg Glu Trp Asp Glu Asn Leu Lys Asp Asp Ser
```

```
                260                 265                 270
Leu Pro Ser Asn Pro Ile Asp Phe Ser Tyr Arg Val Ala Ala Cys Leu
            275                 280                 285

Pro Ile Asp Asp Val Leu Arg Ile Gln Leu Leu Lys Ile Gly Ser Ala
        290                 295                 300

Ile Gln Arg Leu Arg Cys Glu Leu Asp Ile Met Asn Lys Cys Thr Ser
305                 310                 315                 320

Leu Cys Cys Lys Gln Cys Gln Glu Thr Glu Ile Thr Thr Lys Asn Glu
                325                 330                 335

Ile Phe Ser Leu Ser Leu Cys Gly Pro Met Ala Ala Tyr Val Asn Pro
            340                 345                 350

His Gly Tyr Val His Glu Thr Leu Thr Val Tyr Lys Ala Cys Asn Leu
        355                 360                 365

Asn Leu Ile Gly Arg Pro Ser Thr Glu His Ser Trp Phe Pro Gly Tyr
            370                 375                 380

Ala Trp Thr Val Ala Gln Cys Lys Ile Cys Ala Ser His Ile Gly Trp
385                 390                 395                 400

Lys Phe Thr Ala Thr Lys Lys Asp Met Ser Pro Gln Lys Phe Trp Gly
                405                 410                 415

Leu Thr Arg Ser Ala Leu Leu Pro Thr Ile Pro Asp Thr Glu Asp Glu
            420                 425                 430

Ile Ser Pro Asp Lys Val Ile Leu Cys Leu
            435                 440

<210> SEQ ID NO 2
<211> LENGTH: 16
<212> TYPE: PRT
<213> ORGANISM: Artificial
<220> FEATURE:
<223> OTHER INFORMATION: PEP 1

<400> SEQUENCE: 2

Cys Glu Asp Glu Met Glu Val Glu Asp Gln Asp Ser Lys Glu Ala Lys
1               5                   10                  15

<210> SEQ ID NO 3
<211> LENGTH: 13
<212> TYPE: PRT
<213> ORGANISM: Artificial
<220> FEATURE:
<223> OTHER INFORMATION: PEP2

<400> SEQUENCE: 3

Cys Asp Met Glu Glu Phe His Gly Arg Thr Leu His Asp
1               5                   10

<210> SEQ ID NO 4
<211> LENGTH: 15
<212> TYPE: PRT
<213> ORGANISM: Artificial
<220> FEATURE:
<223> OTHER INFORMATION: PEP3

<400> SEQUENCE: 4

Cys Glu Ile Tyr Ala Tyr Arg Glu Glu Gln Asp Phe Gly Ile Glu
1               5                   10                  15

<210> SEQ ID NO 5
<211> LENGTH: 16
<212> TYPE: PRT
<213> ORGANISM: Artificial
```

```
<220> FEATURE:
<223> OTHER INFORMATION: PEP4

<400> SEQUENCE: 5

Cys Gly Arg Gln Arg Phe Lys Val Leu Glu Leu Arg Thr Gln Ser Asp
1               5                   10                  15

<210> SEQ ID NO 6
<211> LENGTH: 17
<212> TYPE: PRT
<213> ORGANISM: Artificial
<220> FEATURE:
<223> OTHER INFORMATION: PEP5

<400> SEQUENCE: 6

Cys Asp Arg Ile Lys Lys Gln Leu Arg Glu Trp Asp Glu Asn Leu Lys
1               5                   10                  15

Asp

<210> SEQ ID NO 7
<211> LENGTH: 445
<212> TYPE: PRT
<213> ORGANISM: Artificial
<220> FEATURE:
<223> OTHER INFORMATION: Mouse CRBN

<400> SEQUENCE: 7

Met Ala Gly Glu Gly Asp Gln Gln Asp Ala Ala His Asn Met Gly Asn
1               5                   10                  15

His Leu Pro Leu Leu Pro Ala Asp Ser Glu Asp Glu Asp Asp Glu Ile
                20                  25                  30

Glu Met Glu Val Glu Asp Gln Asp Ser Lys Glu Ala Arg Lys Pro Asn
            35                  40                  45

Ile Ile Asn Phe Asp Thr Ser Leu Pro Thr Ser His Thr Tyr Leu Gly
    50                  55                  60

Ala Asp Met Glu Glu Phe His Gly Arg Thr Leu His Asp Asp Asp Ser
65                  70                  75                  80

Cys Gln Val Ile Pro Val Leu Pro Glu Val Leu Met Ile Leu Ile Pro
                85                  90                  95

Gly Gln Thr Leu Pro Leu Gln Leu Ser His Pro Gln Glu Val Ser Met
            100                 105                 110

Val Arg Asn Leu Ile Gln Lys Asp Arg Thr Phe Ala Val Leu Ala Tyr
        115                 120                 125

Ser Asn Val Gln Glu Arg Glu Ala Gln Phe Gly Thr Thr Ala Glu Ile
    130                 135                 140

Tyr Ala Tyr Arg Glu Glu Gln Glu Phe Gly Ile Glu Val Val Lys Val
145                 150                 155                 160

Lys Ala Ile Gly Arg Gln Arg Phe Lys Val Leu Glu Leu Arg Thr Gln
                165                 170                 175

Ser Asp Gly Ile Gln Gln Ala Lys Val Gln Ile Leu Pro Glu Cys Val
            180                 185                 190

Leu Pro Ser Thr Met Ser Ala Val Gln Leu Glu Ser Leu Asn Lys Cys
        195                 200                 205

Gln Val Phe Pro Ser Lys Pro Ile Ser Trp Glu Asp Gln Tyr Ser Cys
    210                 215                 220

Lys Trp Trp Gln Lys Tyr Gln Lys Arg Lys Phe His Cys Ala Asn Leu
225                 230                 235                 240

Thr Ser Trp Pro Arg Trp Leu Tyr Ser Leu Tyr Asp Ala Glu Thr Leu
```

-continued

```
                245                 250                 255
Met Asp Arg Ile Lys Lys Gln Leu Arg Glu Trp Asp Glu Asn Leu Lys
            260                 265                 270

Asp Asp Ser Leu Pro Glu Asn Pro Ile Asp Phe Ser Tyr Arg Val Ala
            275                 280                 285

Ala Cys Leu Pro Ile Asp Asp Val Leu Arg Ile Gln Leu Leu Lys Ile
        290                 295                 300

Gly Ser Ala Ile Gln Arg Leu Arg Cys Glu Leu Asp Ile Met Asn Lys
305                 310                 315                 320

Cys Thr Ser Leu Cys Cys Lys Gln Cys Gln Glu Thr Glu Ile Thr Thr
                325                 330                 335

Lys Asn Glu Ile Phe Ser Leu Ser Leu Cys Gly Pro Met Ala Ala Tyr
            340                 345                 350

Val Asn Pro His Gly Tyr Val His Glu Thr Leu Thr Val Tyr Lys Ala
            355                 360                 365

Ser Asn Leu Asn Leu Ile Gly Arg Pro Ser Thr Val His Ser Trp Phe
    370                 375                 380

Pro Gly Tyr Ala Trp Thr Ile Ala Gln Cys Lys Ile Cys Ala Ser His
385                 390                 395                 400

Ile Gly Trp Lys Phe Thr Ala Thr Lys Lys Asp Met Ser Pro Gln Lys
                405                 410                 415

Phe Trp Gly Leu Thr Arg Ser Ala Leu Leu Pro Thr Ile Pro Glu Thr
            420                 425                 430

Glu Asp Glu Ile Ser Pro Asp Lys Val Ile Leu Cys Leu
            435                 440                 445
```